United States Patent
Lee et al.

(10) Patent No.: US 9,505,976 B2
(45) Date of Patent: Nov. 29, 2016

(54) EXCITATION-DEPENDENT FLUORESCENT ORGANIC NANOPARTICLES

(71) Applicant: National Kaohsiung Normal University, Kaohsiung (TW)

(72) Inventors: Kwang-Ming Lee, Kaohsiung (TW);
Jing-Jong Shyue, Kaohsiung (TW);
Sarah Y. Chang, Kaohsiung (TW);
Thomas C. Yang, Kaohsiung (TW)

(73) Assignee: National Kaohsiung Normal University, Kaohsiung (TW)

( * ) Notice: Subject to any disclaimer, the term of this patent is extended or adjusted under 35 U.S.C. 154(b) by 286 days.

(21) Appl. No.: 14/016,037

(22) Filed: Aug. 30, 2013

(65) Prior Publication Data
US 2015/0064799 A1    Mar. 5, 2015

(51) Int. Cl.
*G01N 21/64*    (2006.01)
*C09K 11/06*    (2006.01)
*B82Y 15/00*    (2011.01)

(52) U.S. Cl.
CPC ............... *C09K 11/06* (2013.01); *B82Y 15/00* (2013.01)

(58) Field of Classification Search
CPC ............................... C09K 11/06; B82Y 15/00
See application file for complete search history.

(56) References Cited

FOREIGN PATENT DOCUMENTS

| | | |
|---|---|---|
| CN | 102818790 A | 12/2012 |
| CN | 103044581 A | 4/2013 |
| WO | WO 2012/109755 A1 | 8/2012 |

OTHER PUBLICATIONS

Lee et al., Excitation-dependent visible fluorescence in decameric nanoparticles with monoacylglycerol cluster chromophores, Nature Communications 4, 2013, Article No. 1544, pp. 1-8.*
Weng et al., Conformational dynamics and excitation wavelength dependent photoluminescence of decameric organic nanoparticles. Phys. CHem. Chem. Phys. 2013, vol. 15, pp. 16935-16940.*
H. Ohgi, et al., "Highly Isotactic Poly(Vinyl Alcohol) Derived From tert-Butyl Vinyl Ether," Part IV. Some Physical Properties, Structure and Hydrogen Bonding of Highly Isotactic Poly (Vinyl Alcohol) Films. *Polymer* 47, pp. 1324-1332 (2006).
Marek Józefowicz et al, Excitation-wavelength Dependent Fluorescence of Ethyl 5-(4-aminophenyl)-3-amino-2,4-dicyanobenzoate, J. Floresc, 2011, 21:239-245.

\* cited by examiner

*Primary Examiner* — Shafiqul Haq
(74) *Attorney, Agent, or Firm* — CKC & Partners Co., Ltd.

(57) ABSTRACT

A series of self-assembled monoacylglycerol clusters with excitation-dependent visible fluorescence have been developed.

1 Claim, 29 Drawing Sheets
(26 of 29 Drawing Sheet(s) Filed in Color)

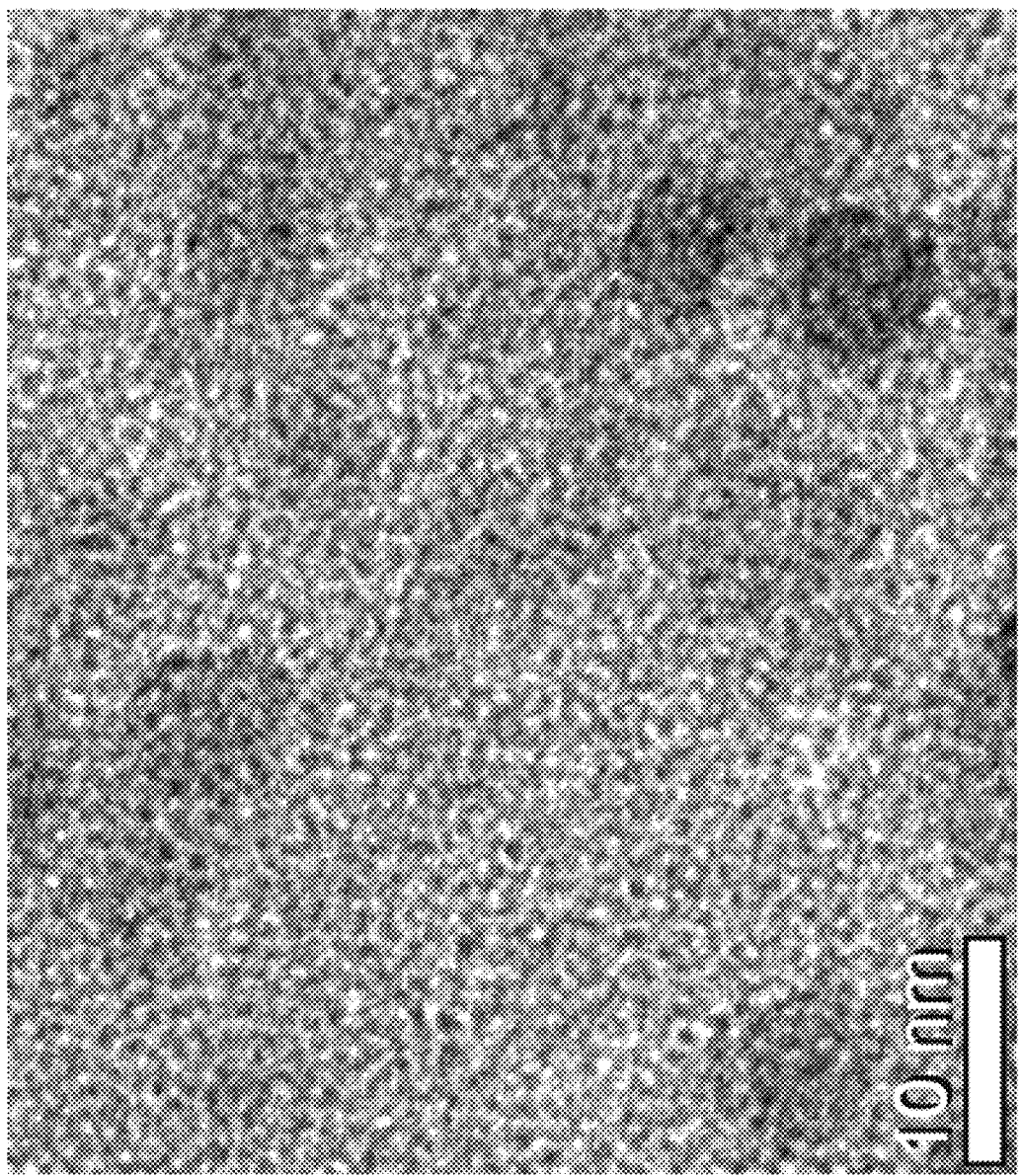

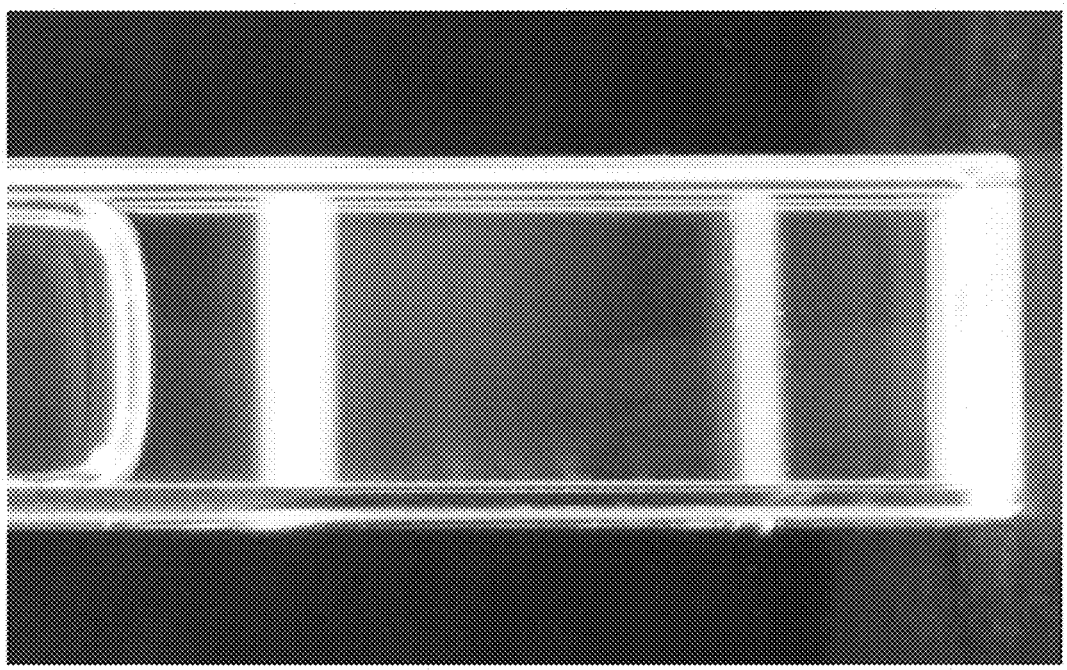

EXCITATION-DEPENDENT FLUORESCENT ORGANIC NANOPARTICLES

BACKGROUND

Technical Field

The disclosure relates to a fluorescent material. More particularly, the disclosure relates to a fluorescent organic nanoparticle.

Description of Related Art

Organic fluorescent nanoparticles, excitation-dependent photoluminescence (or excitation-dependent fluorescent; EDF), hydrogenbonded clusters and lysobisphosphatidic acid are four interesting individual topics in materials and biological sciences. They have attracted much attention not only because of their unique properties and important applications, but also because the nature of their intriguing phenomena remained unclear.

SUMMARY

In one aspect, the present invention is directed to an excitation-dependent fluorescent organic nanoparticles. Each of the excitation-dependent fluorescent organic nanoparticles comprises a cluster of aggregated molecules of 2-monoacylglycerol and 3-monoacylglycerol having the chemical structures shown below:

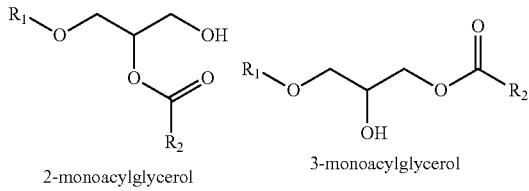

2-monoacylglycerol    3-monoacylglycerol wherein the 2-monoacylglycerol is the major component. According to an embodiment, $R_1$ is an aliphatic group with no more than 30 carbons or an aromatic group with no more than 30 carbons, and $R_2$ is an aliphatic group with no more than 30 carbons or an aromatic group with no more than 30 carbons.

According to another embodiment, the $R_1$ comprises

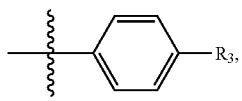

and $R_3$ is an aliphatic group or an aromatic group.

According to yet another embodiment, the $R_2$ comprises

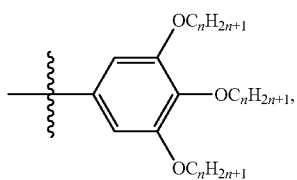

and n=10-20.

According to yet another embodiment, $R_2$ comprises

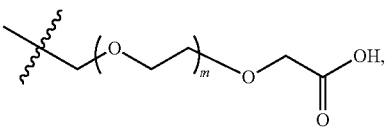

and m is 10-14.

In another aspect, this invention directs to a method of forming an excitation-dependent fluorescent nanoparticles. The method comprises performing a ring-opening reaction and a radical catalyzed 3,2-acyl migration reaction. The ring-opening reaction is performed by reacting an epoxy glycidyl ether and an carboxylic acid to form a first mixture of the 3-monoacylglycerol and the 2-monoacylglycerol, wherein the 3-monoacylglycerol is the major component. The radical catalyzed 3,2-acyl migration reaction is performed by adding a catalyst to the first mixture of the 3-monoacylglycerol and the 2-monoacylglycerol to form the excitation-dependent fluorescent nanoparticles above.

The foregoing presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later. Many of the attendant features will be more readily appreciated as the same becomes better understood by reference to the following detailed description considered in connection with the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 7A is the high resolution transmission electron microscopy (HRTEM) image of 18-EDFONP.

FIG. 8B is a fluorescent photograph of 12-EDFONP in a CH$_2$Cl$_2$ solution.

DETAILED DESCRIPTION

Figure 1A:
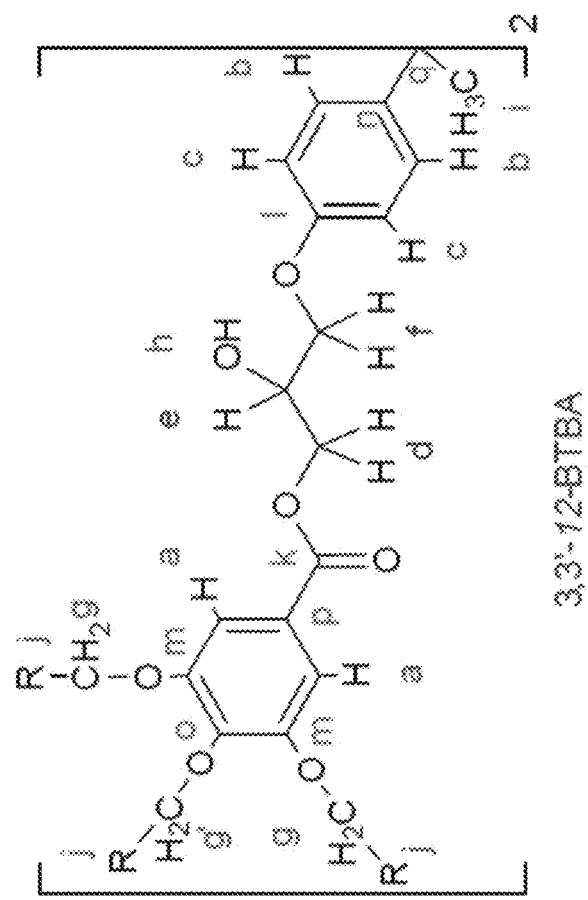
FIG. 1A is a diagram of the chemical structure of 2,2'-12-BTBA and the 3,3'-12-BTBA, and the marks for H and C atoms are also shown.
Figure 1A:
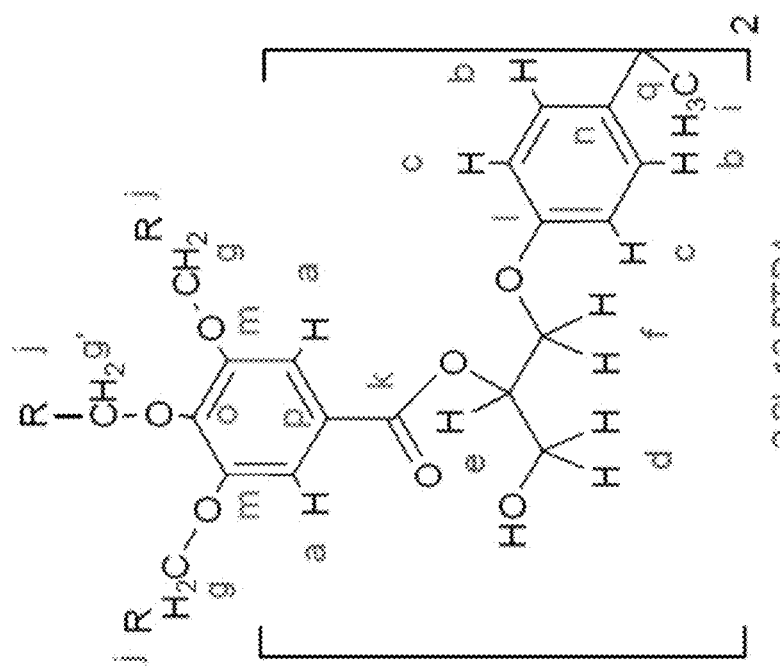

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Excitation-Dependent Fluorescent Organic Nanoparticles

The composition of excitation-dependent fluorescent organic nanoparticles (abbreviated as EDFONPs) comprises at least a cluster of aggregated molecules of 2-monoacylglycerol and 3-monoacylglycerol having the chemical structures shown below:

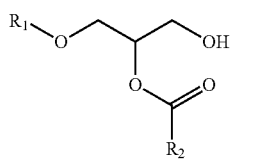

2-monoacylglycerol
Major component

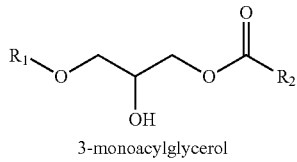

3-monoacylglycerol
Minor component $R_1$ above can be an aliphatic group with no more than 30 carbons or an aromatic group with no more than 30 carbon, such as an alkyl chain, or

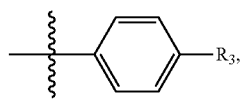

and $R_3$ is an aliphatic group with no more than 30 carbons or an aromatic group with no more than 30 carbons. $R_2$ above can be an aliphatic group or an aromatic group, such as an alkyl chain,

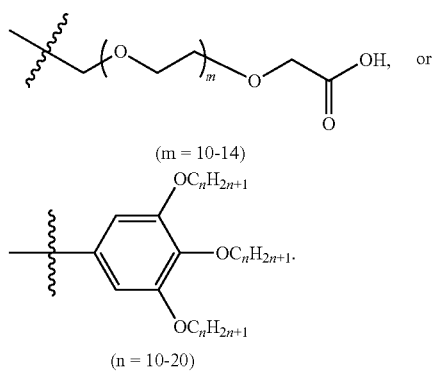

(m = 10-14)

(n = 10-20)

In this cluster, the 2-monoacylglycerol is the major component.

Preparation of Excitation-Dependent Fluorescent Organic Nanoparticles

EDFONPs are prepared by two sequential reactions. The first reaction is a ring-opening reaction, and the second reaction is a radical-catalyzed 3,2-acyl migration reaction. The reaction formula is shown in Scheme 1.

Scheme 1

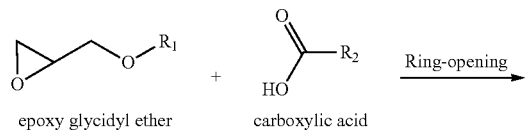

epoxy glycidyl ether    carboxylic acid    Ring-opening

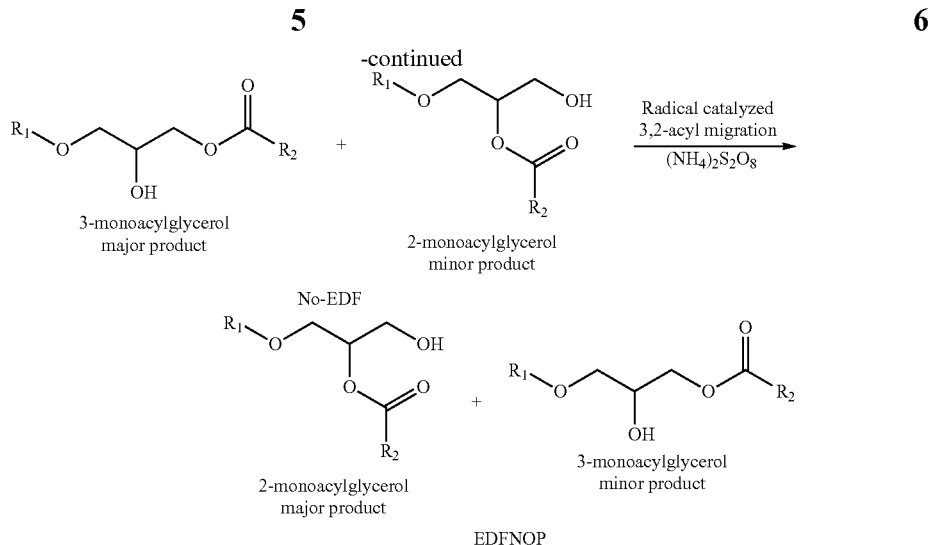

In scheme 1, the $R_1$ of epoxy glycidyl ether can be an aliphatic group or an aromatic group, and the $R_2$ of the carboxylic acid can be an aliphatic group or an aromatic group, as described above. For example, the $R_1$ of the epoxy glycidyl ether can be butyl, octyl, decyl, benzyl, or bisphenol A groups, and the carboxylic acid can be dodecanoic acid, heptadecanoic acid, 3,4,5-tris(n-alkoxyl)benzoic acid, or polyethylene glycol diacid.

In the first reaction, the initial products containing a mixture of a 2-positional isomer as the minor component and a 3-positional isomer as the major component are obtained via a ring-opening reaction by treating the glycidyl ether epoxy with the carboxylic acid. The initial products are abbreviated as No-EDF because no EDF behavior was observed.

In the second reaction, the radical catalyzed 3,2-acyl migration reaction is conducted by treating the initial products with ammonium persulfate $((NH_4)_2S_2O_8)$ as a catalyst under a neat condition. The second products resulting from the migration of the 3,2-acyl contains a mixture of the 2-positional isomer as the major component and the 3-positional isomer as the minor component. The second products are abbreviated as EDFONP because EDF behavior was observed.

Some examples of the above reactions in scheme 1 are provided below.

Embodiment 1: Synthesis of n-No-EDF and n-EDFONP

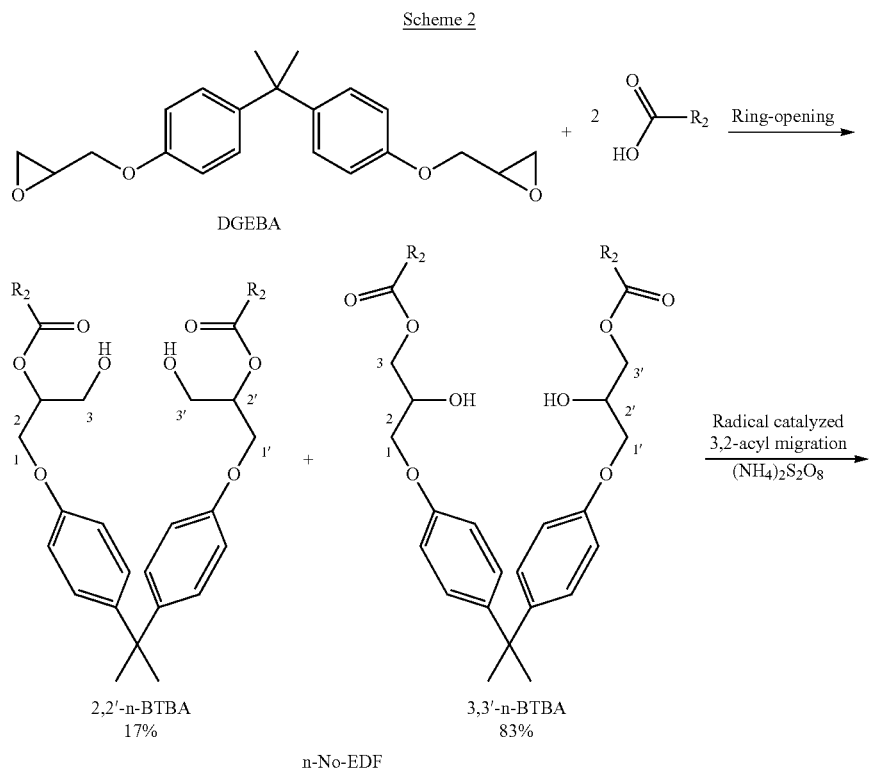

-continued

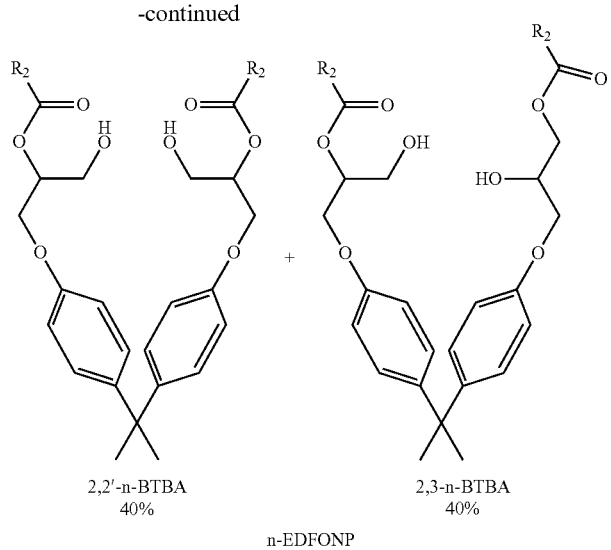

2,2'-n-BTBA 40%      2,3-n-BTBA 40% n-EDFONP

In Scheme 2 of this embodiment, the epoxy glycidyl ether in scheme 1 was diglycidyl ether of bisphenol A (DGEBA), and the carboxylic acid ($R_2$—COOH) was 3,4,5-tris(n-alkoxyl)benzoic acid

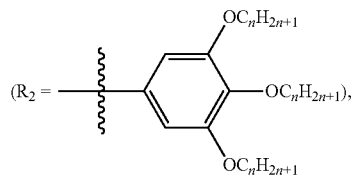

and the carbon number of the alkoxyl group, n, was 12, 14, 16, and 18, respectively.

The obtained initial products No-EDF in Scheme 2 of the first ring opening reaction are denoted as n-No-EDF, and n=12, 14, 16, and 18, respectively. The initial products were a mixture of 2,2'-n-bis(3,4,5-tris(n-alkyloxy)monobenzoyl-glyceride)bisphenol A (abbreviated as 2,2'-n-BTBA) and the 3,3'-n-BTBA, which were identified by $^1$H, $^{13}$C, heteronuclear single quantum correlation (HSQC) and heteronuclear multiple bond correlation (HMBC) NMR experiments.

The obtained final products EDFONP in Scheme 2 of the second 3,2-acyl migration reaction are denoted as n-EDFONP, and n=12, 14, 16, and 18, respectively. Accordingly, the final products were a mixture of 2,2'-n-BTBA and the 2,3-n-BTBA, and also identified through $^1$H, $^{13}$C, HSQC and HMBC NMR spectra, but their NMR spectra are significantly different from that of the n-No-EDFs.

The detailed synthesis of 12-No-EDF and 12-EDFONP are described below to be a representative example, because the same procedure was systematically used for all the members of the series.

Synthesis of 12-No-EDF: A solution of bisphenol A diglycidyl ether (0.68 g, 2.00 mmol), 3,4,5-tris(dodecyloxy) benzoic acid (2.80 g, 4.15 mmol) and tetra-n-butylammonium bromide (TBAB) (0.32 g, 1.00 mmol) in mix-solvent of acetonitrile (40 ml) and xylene (20 ml) was reflux at 85° C. for 24 h. The solvent was removed under reduced pressure. The crude product was recrystallized twice from ethanol, and a white solid is obtained (2.30 g, 68%). The crude product was composed of 2,2'-12-BTBA and the 3,3'-12-BTBA positional isomers.

Figure 1B:
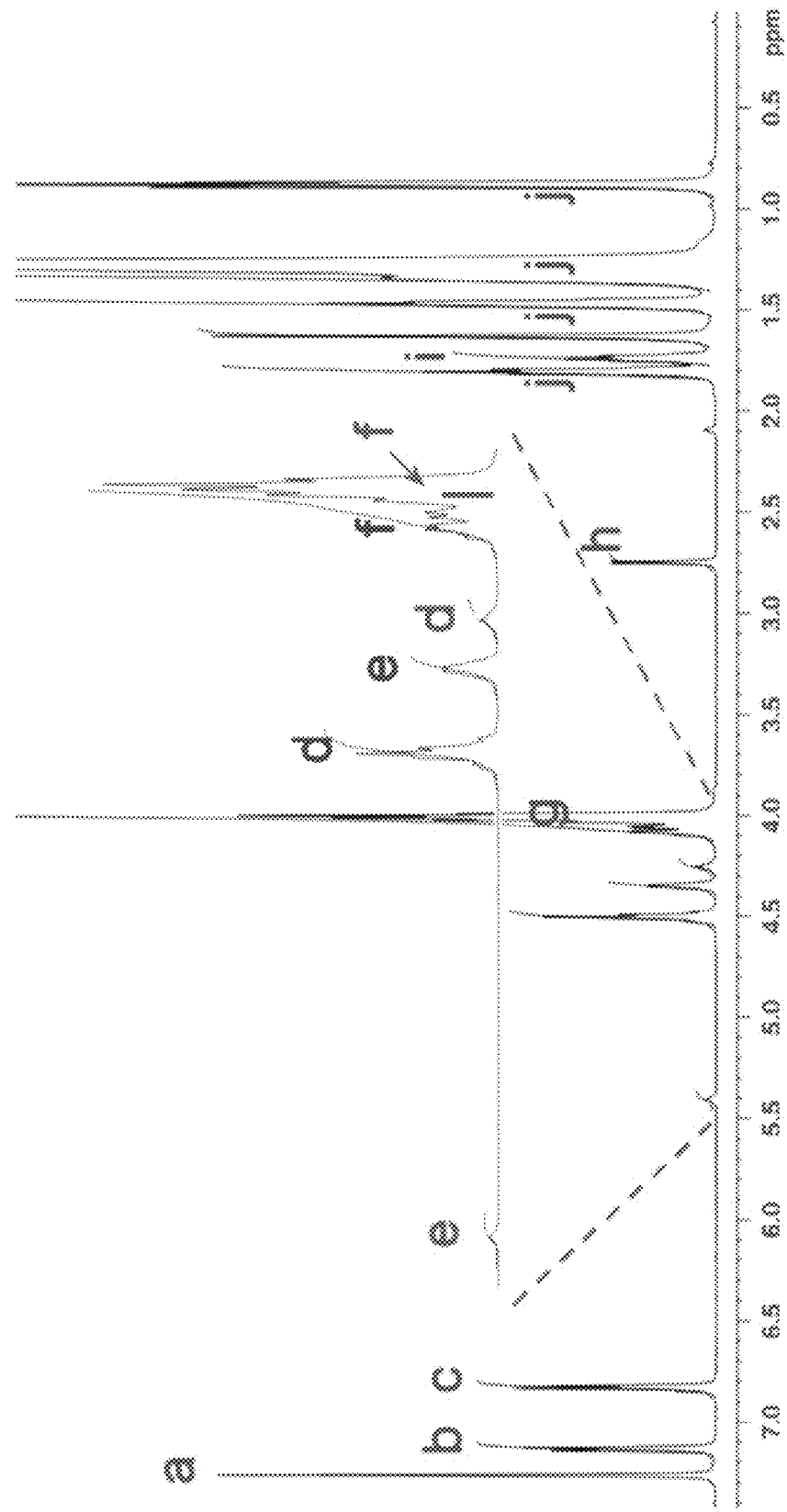
FIGS. 1B and 1C are the $^1$H and DEPT-135 NMR spectra of 12-No-EDF, respectively.
Figure 1C:
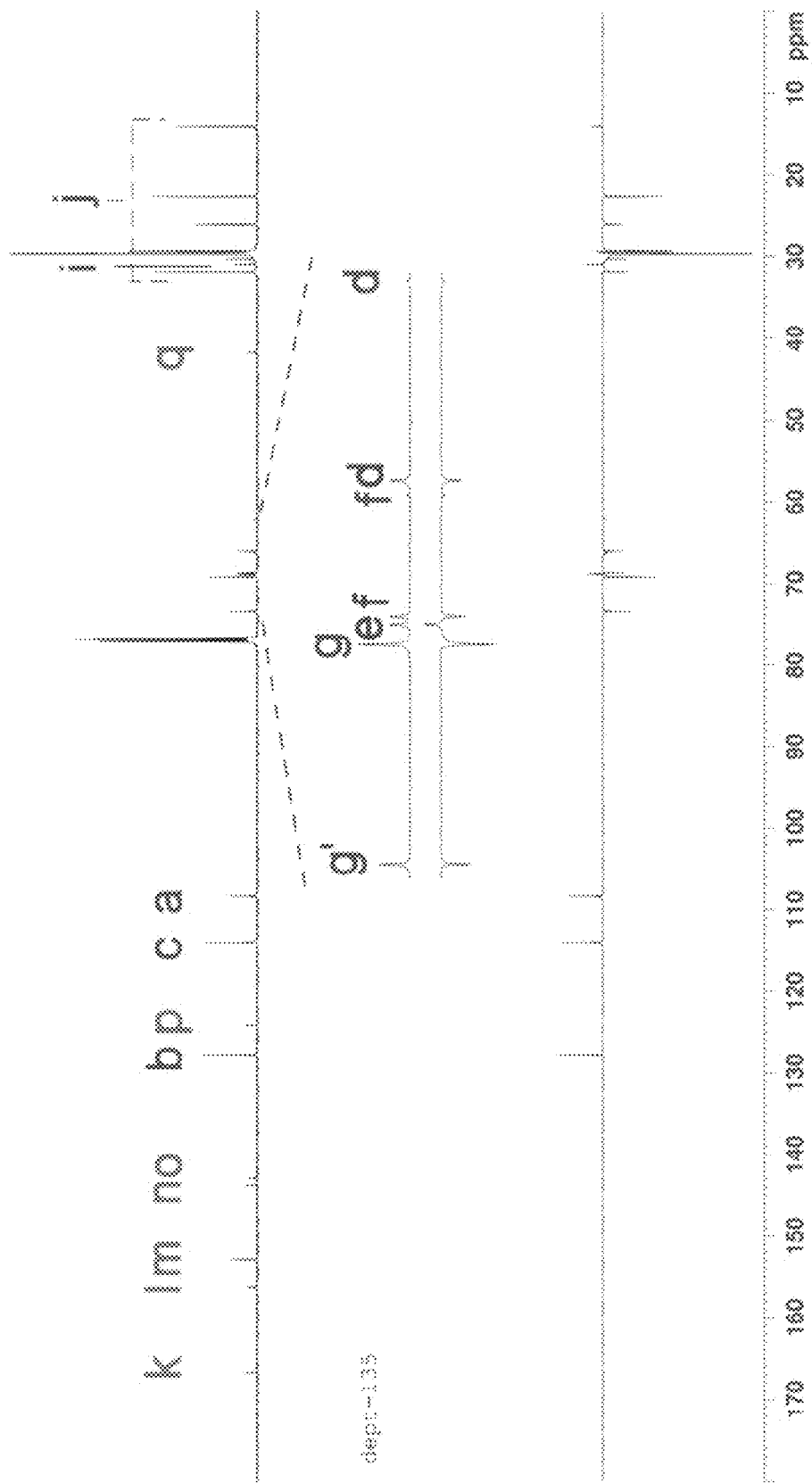

FIG. 1A is a diagram of the chemical structure of 2,2'-12-BTBA and the 3,3'-12-BTBA, and the marks for H and C atoms are also shown. FIGS. 1B and 1C are the $^1$H and DEPT-135 NMR spectra of 12-No-EDF, respectively. From FIGS. 1B and 1C, it can been seen that the molar ratio of the 2,2'-12-BTBA (red e, d and f) and 3,3'-12-BTBA (blue e, d and f) isomers is approximately 17:83. The molar ratio is typical for kinetically controlled reactions because the 3-position of DGEBA contains less steric hindrance than the 2-position.

12-No-EDF: $^1$H NMR (600 MHz, CDCl$_3$): δ7.26 (s, 4H), 7.14 (d, 4H, J=7.8 Hz), 6.83 (d, 4H, J=7.8 Hz), 5.41 (m, 0.34H, 2,2'-12-BTBA), 4.51 (m, 3.32H, 3,3'-12-BTBA), 4.34 (m, 1.66 H, 3,3'-12-BTBA), 4.26 (m, 0.68H, 2,2'-12-BTBA), 4.08 (m, 3.32H, 3,3'-12-BTBA), 4.02 (m, 12.68H,), 2.75 (b, 2H), 1.78 (m, 12H), 1.63 (s, 6H), 1.47 (m, 12H), 1.34 (m, 96H), 0.88 (t, 18H, J=6.6 Hz); $^{13}$C NMR (150 MHz, CDCl3): δ 166.8, 156.2, 152.9, 143.8, 142.8, 127.6, 124.1, 114.0, 108.4, 77.1, 73.5, 69.3, 68.9 (3,3'-12-BTBA), 68.8 (3,3'-12-BTBA), 66.4 (2,2'-12-BTBA), 66.1 (3,3'-12-BTBA), 62.3 (2,2'-12-BTBA), 41.8, 31.9-22.7, 14.1; Elementary analysis (calcd., found for $C_{107}H_{180}O_{14}$): C (76.02, 76.01), H (10.73, 10.79).

14-No-EDF: $^1$H NMR (600 MHz, CDCl$_3$): δ7.26 (s, 4H), 7.14 (d, 4H, J=7.8 Hz), 6.83 (d, 4H, J=7.8 Hz), 5.41 (m, 0.34H, 2,2'-14-BTBA), 4.51 (m, 3.32H, 3,3'-14-BTBA), 4.34 (m, 1.66 H, 3,3'-14-BTBA), 4.26 (m, 0.68H, 2,2'-14-BTBA), 4.08 (m, 3.32H, 3,3'-14-BTBA), 4.02 (m, 12.68H,), 2.75 (b, 2H), 1.78 (m, 12H), 1.63 (s, 6H), 1.47 (m, 12H), 1.34 (m, 120H), 0.88 (t, 18H, J=6.6 Hz); $^{13}$C NMR (150 MHz, CDCl3): δ 166.8, 156.2, 152.9, 143.8, 142.8, 127.6, 124.1, 114.0, 108.4, 77.1, 73.5, 69.3, 68.9 (3,3'-14-BTBA), 68.8 (3,3'-14-BTBA), 66.4 (2,2'-14-BTBA), 66.1(3,3'-14-BTBA), 62.3 (2,2'-14-BTBA), 41.8, 31.9-22.7, 14.1; Elementary analysis (calcd., found for $C_{119}H_{204}O_{14}$): C (76.89, 76.87), H (11.06, 11.03).

16-No-EDF: $^1$H NMR (600 MHz, CDCl$_3$): δ7.26 (s, 4H), 7.14 (d, 4H, J=7.8 Hz), 6.83 (d, 4H, J=7.8 Hz), 5.41 (m, 0.34H, 2,2'-16-BTBA), 4.51 (m, 3.32H, 3,3'-16-BTBA), 4.34 (m, 1.66 H, 3,3'-16-BTBA), 4.26 (m, 0.68H, 2,2'-16-BTBA), 4.08 (m, 3.32H, 3,3'-16-BTBA), 4.02 (m, 12.68H,), 2.75 (b, 2H), 1.78 (m, 12H), 1.63 (s, 6H), 1.47 (m, 12H), 1.34 (m, 144H), 0.88 (t, 18H, J=6.6 Hz); $^{13}$C NMR (150 MHz, CDCl3): δ 166.8, 156.2, 152.9, 143.8, 142.8, 127.6, 124.1, 114.0, 108.4, 77.1, 73.5, 69.3, 68.9 (3,3'-16-BTBA), 68.8 (3,3'-16-BTBA), 66.4 (2,2'-16-BTBA), 66.1 (3,3'-16-BTBA), 62.3 (2,2'-16-BTBA), 41.8, 31.9-22.7, 14.1; Elementary analysis (calcd., found for $C_{131}H_{228}O_{14}$): C (77.61, 77.23), H (11.34, 11.28).

18-No-EDF: $^1$H NMR (600 MHz, CDCl$_3$): δ7.26 (s, 4H), 7.14 (d, 4H, J=7.8 Hz), 6.83 (d, 4H, J=7.8 Hz), 5.41 (m, 0.34H, 2,2'-18-BTBA), 4.51 (m, 3.32H, 3,3'-18-BTBA), 4.34 (m, 1.66 H, 3,3'-18-BTBA), 4.26 (m, 0.68H, 2,2'-18-BTBA), 4.08 (m, 3.32H, 3,3'-18-BTBA), 4.02 (m, 12.68H,), 2.75 (b, 2H), 1.78 (m, 12H), 1.63 (s, 6H), 1.47 (m, 12H), 1.34 (m, 168H), 0.88 (t, 18H, J=6.6 Hz); $^{13}$C NMR (150 MHz, CDCl3): δ 166.8, 156.2, 152.9, 143.8, 142.8, 127.6, 124.1, 114.0, 108.4, 77.1, 73.5, 69.3, 68.9 (3,3'-14-BTBA), 68.8 (3,3'-18-BTBA), 66.4 (2,2'-18-BTBA), 66.1 (3,3'-18-BTBA), 62.3 (2,2'-18-BTBA), 41.8, 31.9-22.7, 14.1; Elementary analysis (calcd., found for $C_{143}H_{252}O_{14}$): C (78.23, 77.94), H (11.57, 11.58).

Synthesis of 12-EDFONP: 12-No-EDF (0.7402 g, 0.44 mmol) and ammonium persulfate (($NH_4)_2S_2O_8$) (0.013 g, 0.057 mmol) were heated and stirred under $N_2$ at 150° C. for 38 h in a neat condition. The crude product was then dissolved in $CH_2Cl_2$ and filtered. The filtrate was dried under vacuum to give a brown product with a yield of 97% (0.72 g, 0.43 mmol). The brown product is composed of 2,2'-12-BTBA, 2,3-12-BTBA, 3,3'-12-BTBA and 2,3-12-diacylglycerol-bisphenol-glycerol isomers (a phosphatidylglycerol (PG)-like compound), and no non-acyl migrated side product is found.

Figure 2A:
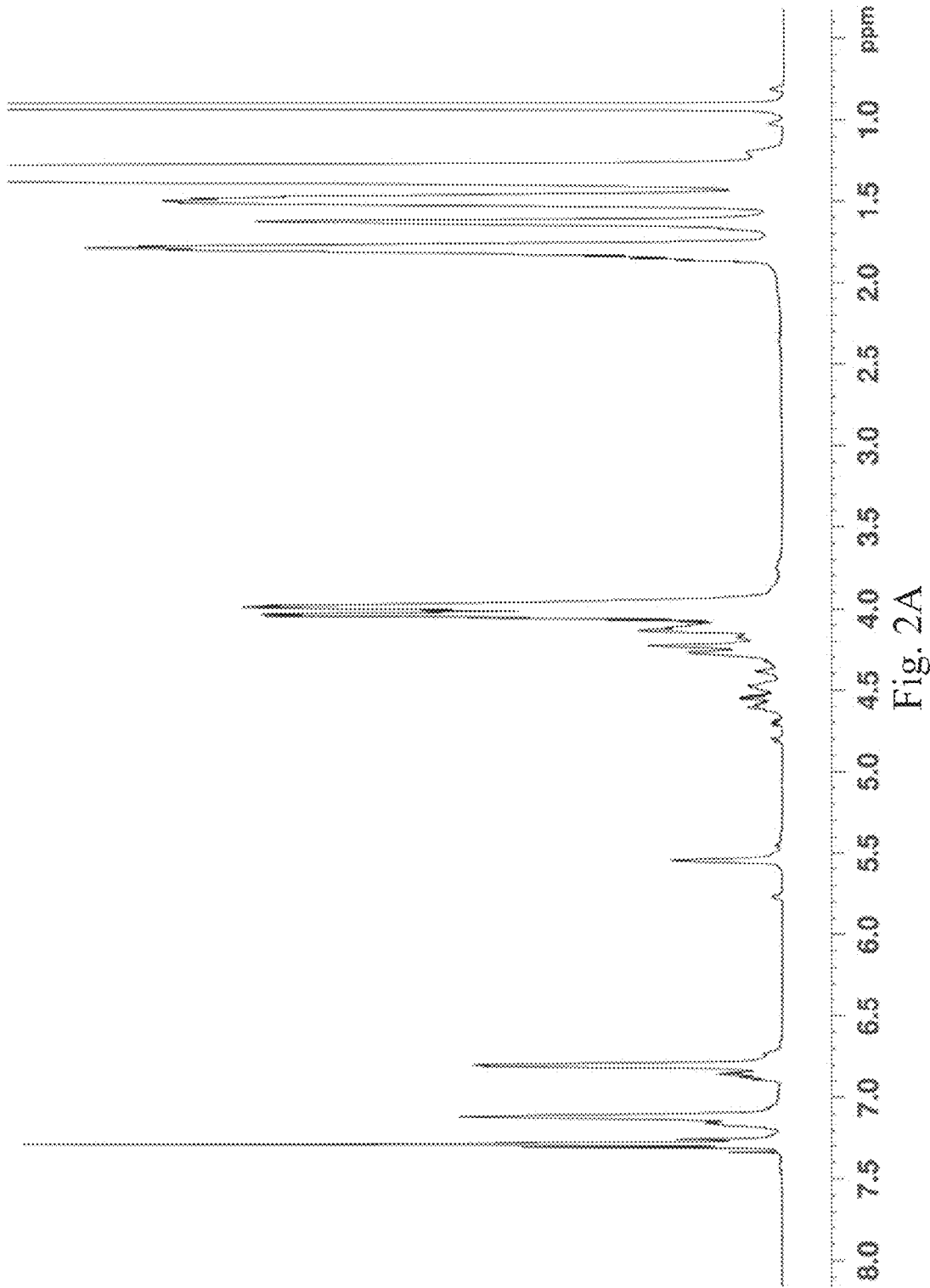
FIGS. 2A and 2B are the $^1$H and DEPT-135 NMR spectra of 12-EDFONP, respectively.
Figure 2B:
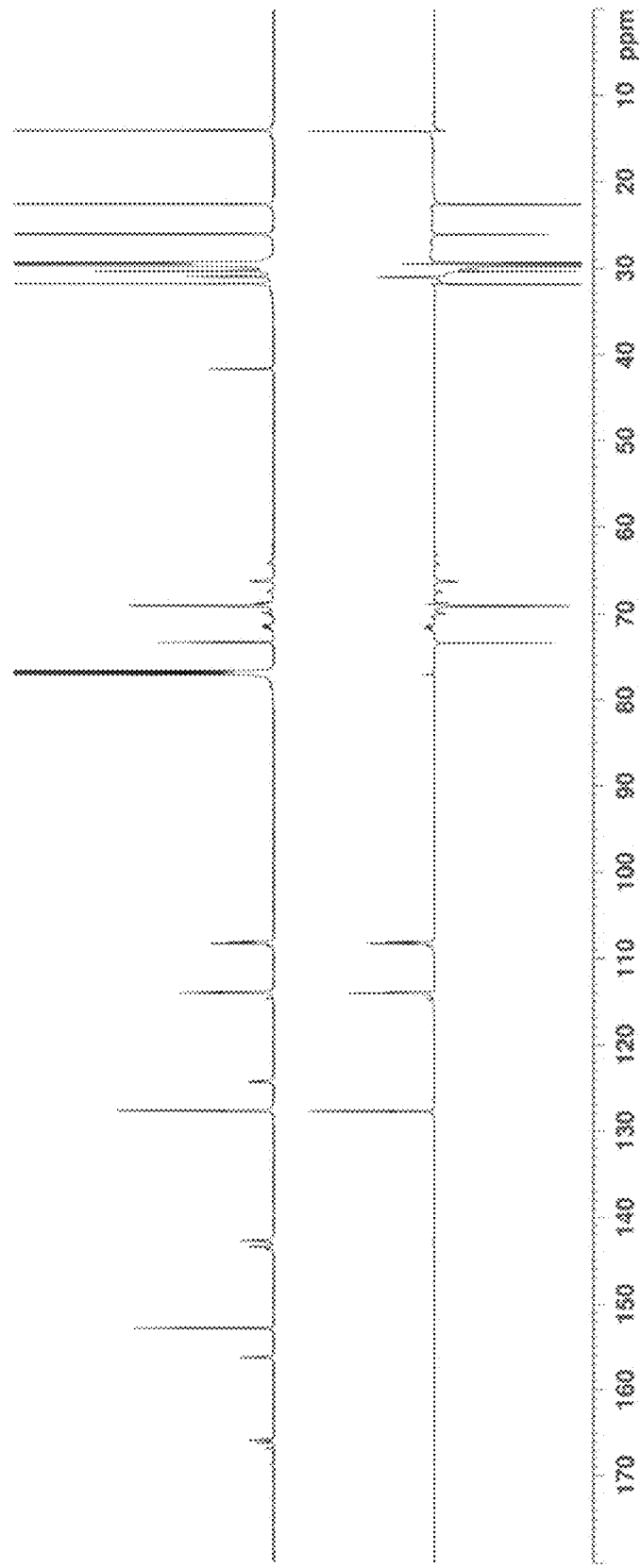
Figure 2C:
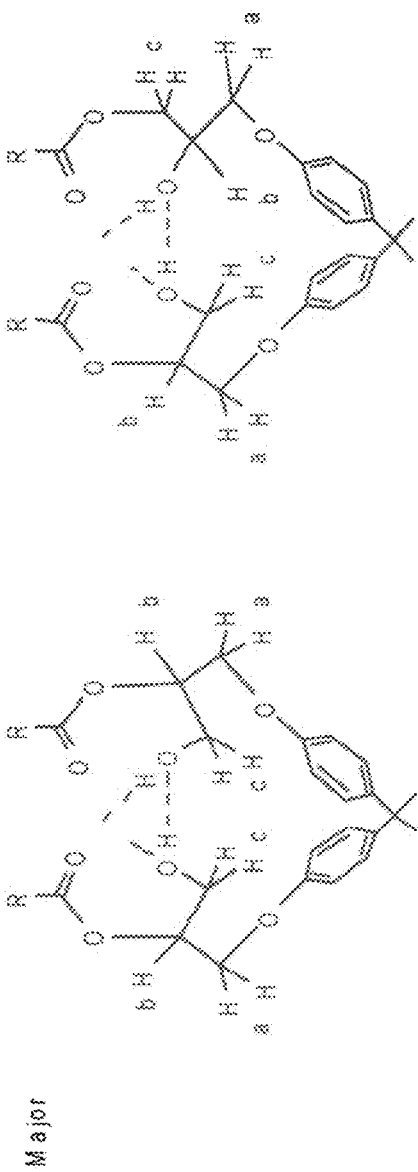
FIG. 2C shows the chemical structures of 2,2'-12-BTBA, 2,3-12-BTBA, 3,3'-12-BTBA, and 2,3-diacylglycerol bisphenol A.
Figure 2C:
Figure 2C:
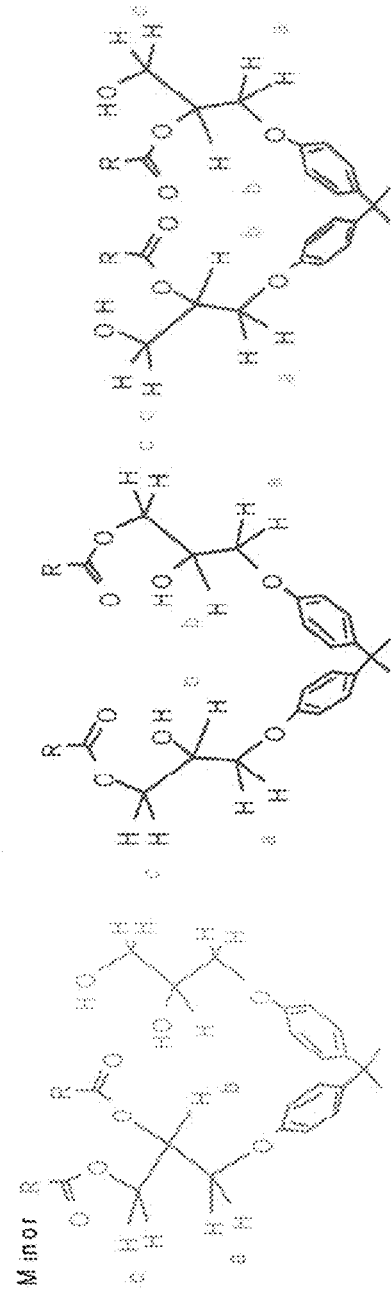

FIGS. 2A and 2B are the $^1$H and DEPT-135 NMR spectra of 12-EDFONP, respectively. In FIG. 2A, the $^1$H signals of the 12-EDFONP in CDCl$_3$ at 10 mM are composed of approximately 80% broad and 20% sharp signals. The dominant broad NMR signals are assigned to 2,2'-12-BTBA (40%) and 2,3-12-BTBA (40%), and they have significant upfield or downfield shifts compared with that of the initial 12-No-EDF. The remaining 20% sharp signals correspond to free 2,2'-12-BTBA (1%), free 3,3'-12-BTBA (15%) and free 2,3-12-diacylglycerol-bisphenol-glycerol isomer (4%), and the chemical structures thereof are shown in FIG. 2C.

These broad signals in FIG. 2A are attributed to the extremely dense aggregated structures in which the internal conformational mobility is reduced. In contrast, all of the $^1$H NMR signals corresponding to 2,2'-12-BTBA and 3,3'-12-BTBA in the 12-No-EDF in CDCl$_3$ at 10 mM in FIG. 1A are normally sharp, which indicates no dense aggregated structure being formed in the low concentration of 2,2'-12-BTBA. In other words, the increased concentration of the 2-monoacylglycerol moieties in the 12-EDFONP from approximately 17% to 61% after the 3,2-acyl migration causes the formation of dense aggregated structures with a yield of 80%.

Remarkable differences in both the $^{13}$C and $^1$H chemical shifts are observed in the comparison of the 12-EDFONP and 12-No-EDF NMR spectra.

Figure 2D:
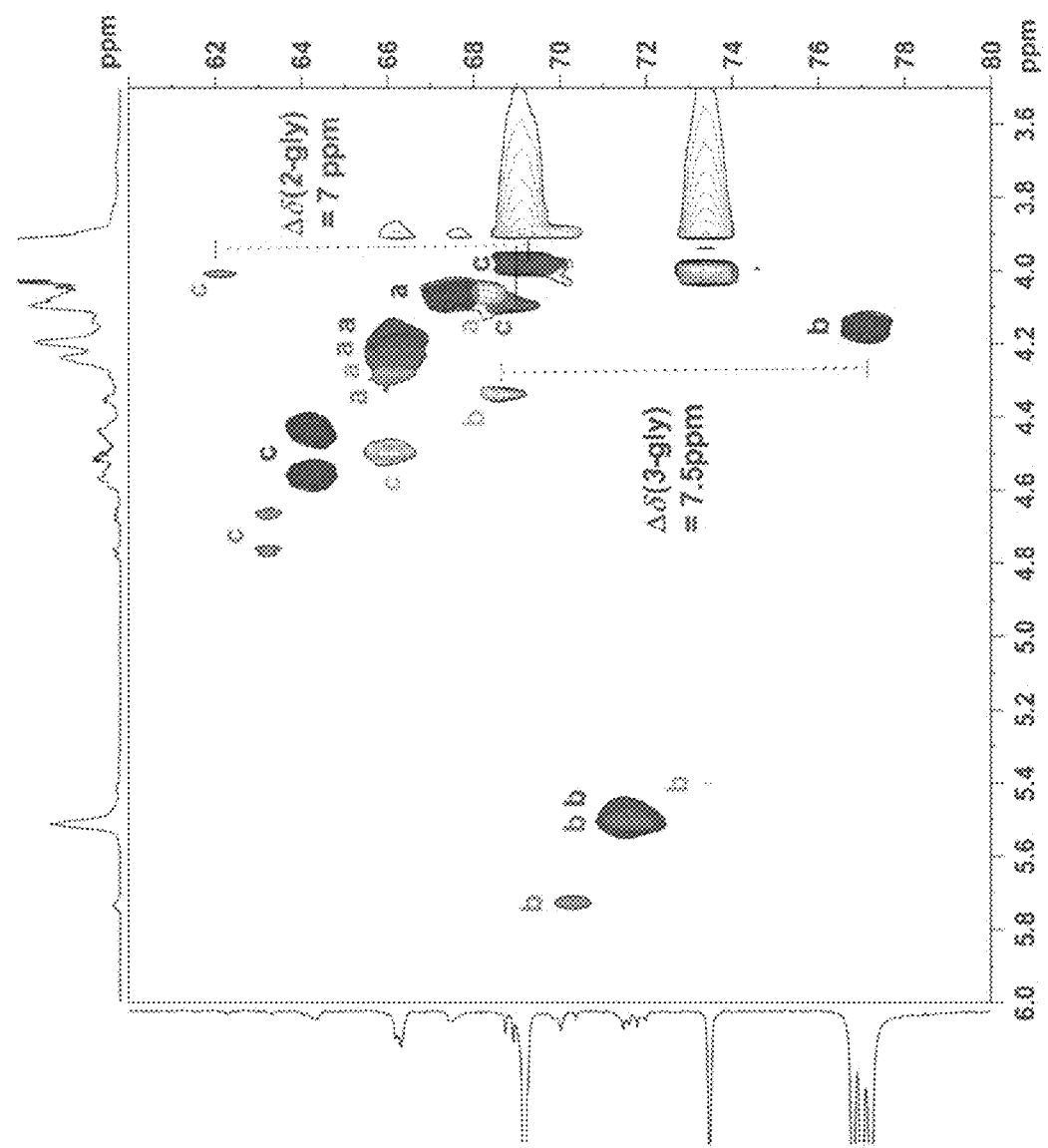
FIG. 2D is a part of two-dimensional $^1$H- $^{13}$C HSQC spectrum of 12-EDFONP in CDCl$_3$ at room temperature.

FIG. 2D is a part of two-dimensional $^1$H-$^{13}$C HSQC spectrum of 12-EDFONP in CDCl$_3$ at room temperature. In FIG. 2D, the $^{13}$C signals of the hydroxyl-bearing carbon of 2,2'-12-BTBA and 2,3-12-BTBA respectively undergo a significant downfield shift of approximately 7.0 and 7.5 ppm relative to the signals of both BTBAs without dense aggregation in 12-No-EDF. The Δδ 7.0 and 7.5 ppm downfield shifts are typical for the hydroxyl-bearing carbons of polyvinyl alcohol and are characteristic of the formation of oligomeric alcohol clusters through continuous alcohol O—H—O—H hydrogen bonding (Ohgi, H., Sato, T., Hu, S. H. & Horii, F. Highly Isotactic Poly(Vinyl Alcohol) Derived From tert-Butyl Vinyl Ether. Part IV. Some Physical Properties, Structure And Hydrogen Bonding Of Highly Isotactic Poly(Vinyl Alcohol) Films. *Polymer* 47, 1324-1332, 2006).

Figure 3A:
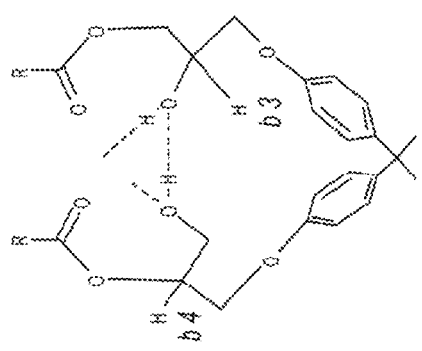
FIG. 3A shows the chemical structures of 2,2'-12-BTBA, 2,3-12-BTBA, 3,3'-12-BTBA and free 2,3-12-diacylglycerol-bisphenol-glycerol isomer.
Figure 3A:
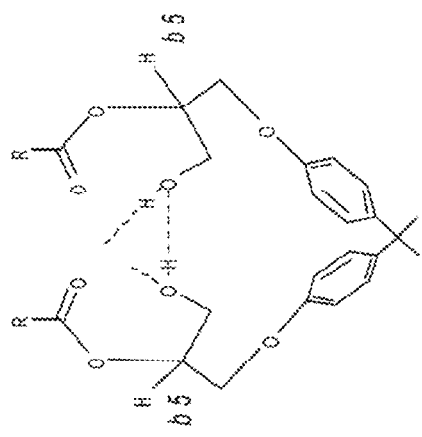
Figure 3A:
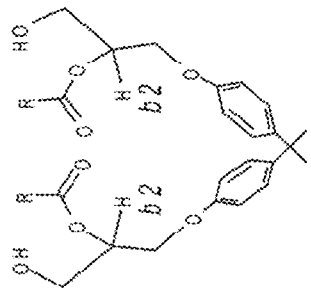
Figure 3A:
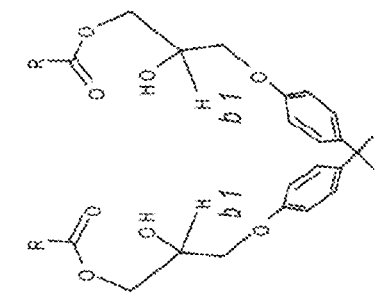
Figure 3A:
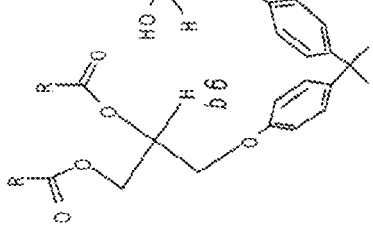
Figure 3B:
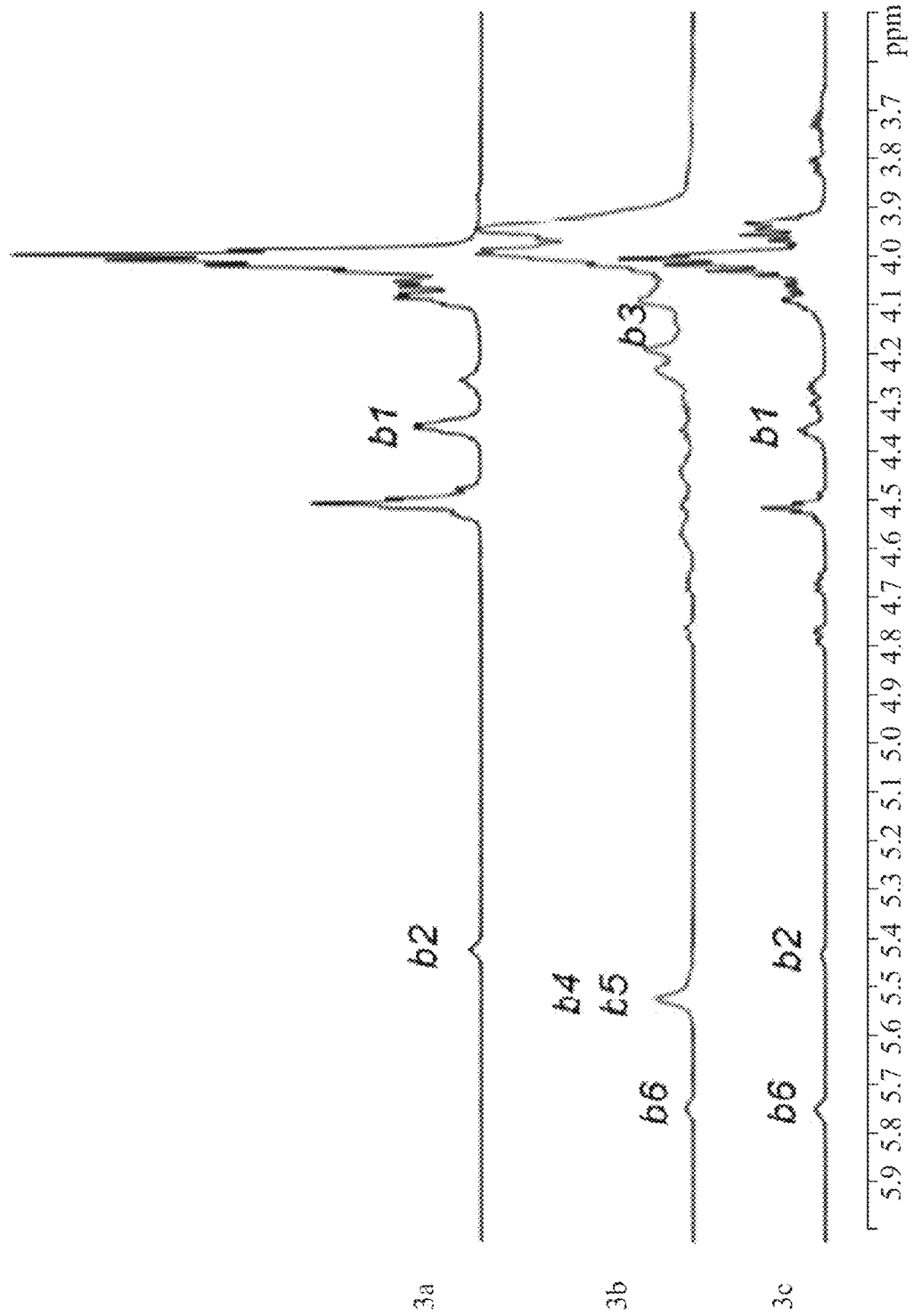
FIG. 3B is the $^1$H NMR spectra of 12-No-EDF (spectrum 3a), product obtained by treating 12-No-EDF with $(NH_4)_2S_2O_8$ (spectrum 3b), and product obtained by treating 12-No-EDF with $K_2CO_3$ (spectrum 3c).

To determine whether the acyl migration is caused by the sulfate radical or the basicity of the sulfate, $(NH_4)_2S_2O_8$ was replaced by potassium carbonate ($K_2CO_3$) to treat 12-No-EDF under the same reaction conditions, i.e. 150° C. for 38 hours. The $^1$H NMR spectra of 12-No-EDF, product obtained by treating 12-No-EDF with $(NH_4)_2S_2O_8$, and product obtained by treating 12-No-EDF with $K_2CO_3$ were respectively shown in FIG. 3B, and the marks of hydrogen atoms of 2,2'-12-BTBA, 2,3-12-BTBA, free 2,2'-12-BTBA, free 3,3'-12-BTBA, and free 2,3-12-diacylglycerol-bisphenol-glycerol are shown in FIG. 3A. In spectrum 3a, it showed that 12-No-EDF is composed of 2,2'-12-BTBA (peak b2) and 3,3'-12-BTBA (peak b1). In spectrum 3b, it can be seen that the 12-EDFONP contains 2,2'-12-BTBA (peak b5) and 2,3'-12-BTBA (peak b3 and b4) with collective proton motion. In addition, a small amount of 2,3-diacylglycerol-bisphenol-glycerol (peak b6) was obtained, but no free 2,2'-isomer (peak b2) was observed. In spectrum 3c, it can be seen that no peaks b3 and b4 was obtained. Therefore, the radical-catalyzed 3,2-acyl migration was established.

12-EDFONP: $^1$H NMR (600 MHz, CDCl3): δ7.27 (b, 4H), 7.11 (b, 4H), 6.88 (b, 4H), 5.73 (s, 0.04H), 5.52 (s, 1.2H), 5.42 (s, 0.02H), 4.78 (m, 0.04H), 4.66 (m, 0.04H), 4.52 (b, 1.4H), 4.36 (b, 0.3H), 4.11 (b, 18.96H), 1.76 (m, 12H), 1.60 (s, 6H), 1.46 (m, 12H), 1.27 (m, 96H), 0.87 (t, 18H, J=6.6 Hz); $^{13}$C NMR (150 MHz, CDCl3): δ 170.9, 160.1, 143.8, 143.1, 127.8, 124.2, 114.4, 108.2, 77.1, 73.5, 71.8, 70.2, 69.2, 68.9, 68.7, 68.9, 67.9, 66.3, 64.4, 63.3, 62.3, 41.8, 31.9, 31.1, 30.4, 29.6, 26.1, 22.7, 14.1; Elementary analysis (calcd., found for $C_{107}H_{180}O_{14}$): C (76.02, 76.74), H (10.73, 10.74).

14-EDFONP: $^1$H NMR (600 MHz, CDCl$_3$): δ7.27 (b, 4H), 7.11 (b, 4H), 6.88 (b, 4H), 5.73 (s, 0.04H), 5.52 (s, 1.2H), 5.42 (s, 0.02H), 4.78 (m, 0.04H), 4.66 (m, 0.04H), 4.52 (b, 1.4H), 4.36 (b, 0.3H), 4.11 (b, 18.96H), 1.76 (m, 12H), 1.60 (s, 6H), 1.46 (m, 12H), 1.27 (m, 120H), 0.87 (t, 18H, J=6.6 Hz); $^{13}$C NMR (150 MHz, CDCl3): δ 170.9, 160.1, 143.8, 143.1, 127.8, 124.2, 114.4, 108.2, 77.1, 73.5, 71.8, 70.2, 69.2, 68.9, 68.7, 68.9, 67.9, 66.3, 64.4, 63.3, 62.3, 41.8, 31.9, 31.1, 30.4, 29.6, 26.1, 22.7, 14.1; Elementary analysis (calcd., found for $C_{119}H_{204}O_{14}$): C (76.89, 77.34), H (11.06, 11.07).

16-EDFONP: $^1$H NMR (600 MHz, CDCl$_3$): δ7.27 (b, 4H), 7.11 (b, 4H), 6.88 (b, 4H), 5.73 (s, 0.04H), 5.52 (s, 1.2H), 5.42 (s, 0.02H), 4.78 (m, 0.04H), 4.66 (m, 0.04H), 4.52 (b, 1.4H), 4.36 (b, 0.3H), 4.11 (b, 18.96H), 1.76 (m, 12H), 1.60 (s, 6H), 1.46 (m, 12H), 1.27 (m, 144H), 0.87 (t, 18H, J=6.6 Hz); $^{13}$C NMR (150 MHz, CDCl3): δ 170.9, 160.1, 143.8, 143.1, 127.8, 124.2, 114.4, 108.2, 77.1, 73.5, 71.8, 70.2, 69.2, 68.9, 68.7, 68.9, 67.9, 66.3, 64.4, 63.3, 62.3, 41.8, 31.9, 31.1, 30.4, 29.6, 26.1, 22.7, 14.1; Elementary analysis (calcd., found for $C_{131}H_{228}O_{14}$): C (77.61, 77.91), H (11.34, 11.38).

18-EDFONP: $^1$H NMR (600 MHz, CDCl$_3$): δ7.27 (b, 4H), 7.11 (b, 4H), 6.88 (b, 4H), 5.73 (s, 0.04H), 5.52 (s, 1.2H), 5.42 (s, 0.02H), 4.78 (m, 0.04H), 4.66 (m, 0.04H), 4.52 (b, 1.4H), 4.36 (b, 0.3H), 4.11 (b, 18.96H), 1.76 (m, 12H), 1.60 (s, 6H), 1.46 (m, 12H), 1.27 (m, 168H), 0.87 (t, 18H, J=6.6 Hz); $^{13}$C NMR (150 MHz, CDCl3): δ 170.9, 160.1, 143.8, 143.1, 127.8, 124.2, 114.4, 108.2, 77.1, 73.5, 71.8, 70.2, 69.2, 68.9, 68.7, 68.9, 67.9, 66.3, 64.4, 63.3, 62.3, 41.8, 31.9, 31.1, 30.4, 29.6, 26.1, 22.7, 14.1; Elementary analysis (calcd., found for $C_{143}H_{252}O_{14}$): C (78.23, 78.62), H (11.57, 11.57).

Embodiment 2: Synthesis of 17-No-EDF and 17-EDFONP

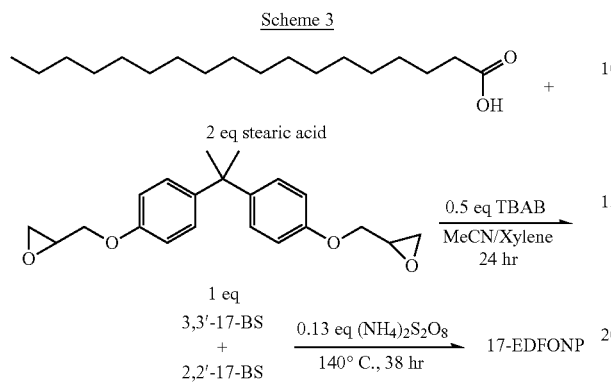

Scheme 3

The synthesis of 17-No-EDF and 17-EDFONP are shown in Scheme 3. The detailed synthesis of 17-No-EDF and 17-EDFONP is described below.

Figure 4A:
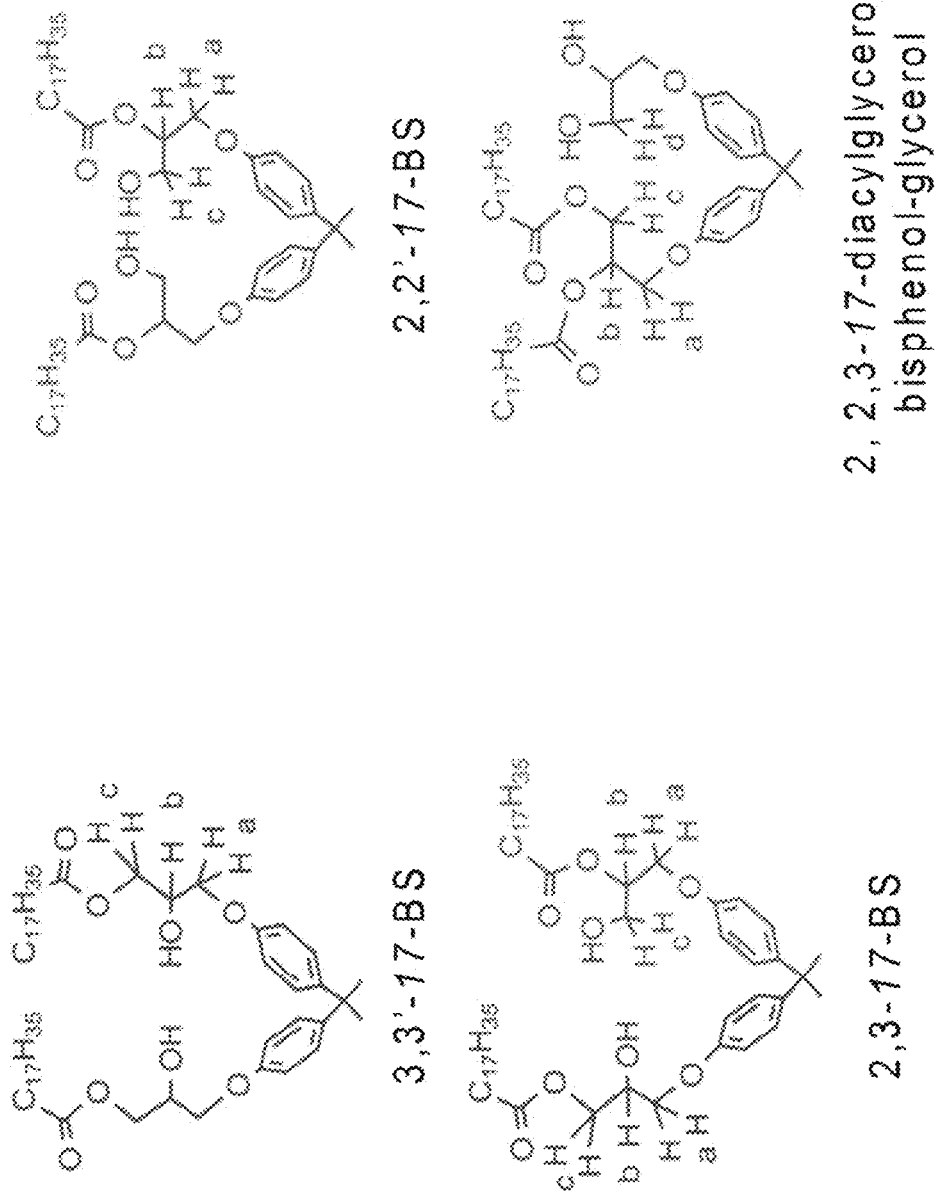
FIG. 4A shows the chemical structures of 2,2'-17-BS, 2,3-17-BS, 3,3'-17-BS and 2,3-17-diacylglycerol-bisphenol-glycerol.
Figure 4B:
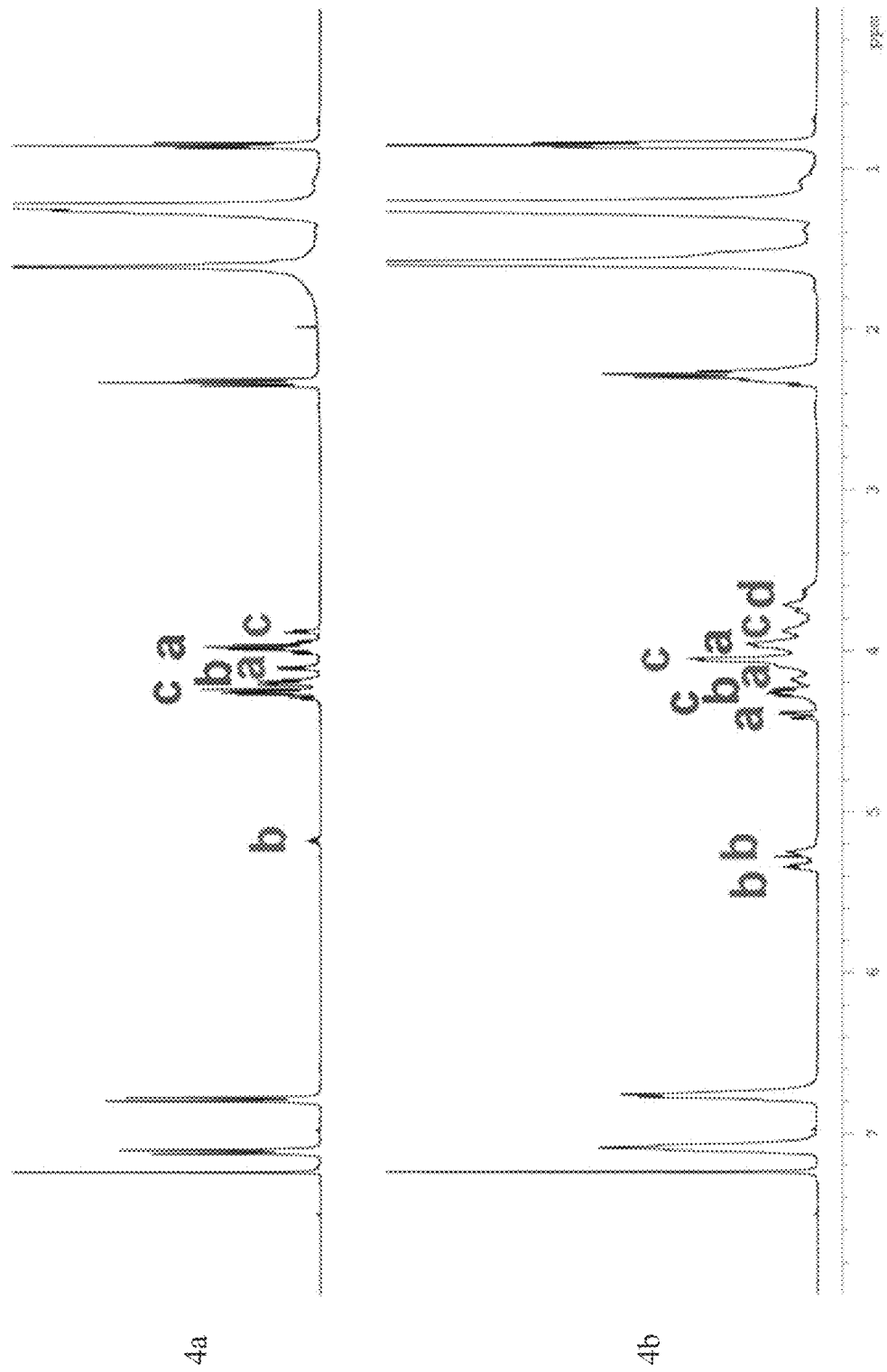
FIG. 4B is the $^1$H NMR spectra of 17-No-EDF (spectrum 4a) and 17-EDFONP (spectrum 4b).

17-No-EDF: A solution of bisphenol A diglycidyl ether (2.34 g, 6.87 mmol) and octadecanoic acid (3.91 g, 13.74 mmol) in mix-solvent of acetonitrile (40 ml) and xylene (20 ml) was reflux at 85° C. for 24 h. In this step, 0.5 equivalent of tetra-n-butylammonium bromide (TBAB) was added to increase the reactivity of epoxy ring opening reaction. The solvent was removed under reduced pressure. The crude product was recrystallized twice from acetonitrile, and a white solid of 17-No-EDF was obtained (4.81 g, 77%). The 17-No-EDF was composed of 2,2'-17-BS and 3,3'-17-BS positional isomers. The chemical structures of 2,2'-17-BS and 3,3'-17-BS are shown in FIG. 4A, and the $^1$H NMR spectrum of 17-No-EDF is shown in spectrum 4a of FIG. 4B. Some spectra data are described below.

$^1$H NMR (400 MHz, $CDCl_3$): δ 7.11 (d, 4H, J=8.4 Hz), 6.79 (d, 4H, J=8.4 Hz), 5.18 (d, 0.31H, J=6.8 Hz), 4.27 (m, 2.97H), 4.20 (m, 2H), 4.06 (d, 0.82H, J=5.2 Hz), 3.96 (m, 3.32H), 3.96 (d, 0.58H, J=5.2 Hz), 2.33 (t, 4H, J=7.6 Hz), 1.61 (b, 10H), 1.23 (b, 56H), 0.86 (t, 6H, J=6.8 Hz); $^{13}$C NMR (100 MHz, $CDCl_3$): δ 174.0, 156.2, 143.8, 127.8, 114.0, 72.7, 68.7, 66.2, 65.2, 62.1, 41.7, 34.3, 33.6, 31.9, 31.0, 29.4, 24.9, 22.7, 14.1; MS (MALDI-TOF): 931.83 [M+Na]$^+$.

17-EDFONP: The 17-No-EDF (2.21 g, 0.32 mmol) and ammonium persulfate (0.07 g, 0.32 mmol) were heated and stirred under $N_2$ atmosphere at 140° C. for 38 h. The crude product was then dissolved in $CH_2Cl_2$ and filtered. The filtrate was dried under vacuum to give a brown product of 17-EDFONP with a yield of 64% (4.00 g). The 17-EDFONP was composed of 2,2'-17-BS, 2,3-17-BS, 3,3'-17-BS and 2,3-17-diacylglycerol-bisphenol-glycerol isomers, and no any non-acyl migrated side product is found. The chemical structures of 2,2'-17-BS, 2,3-17-BS, 3,3'-17-BS and 2,3-17-diacylglycerol-bisphenol-glycerol are shown in FIG. 4A, and the $^1$H NMR spectrum of 17-EDFONP is shown in spectrum 4b of FIG. 4B. Some spectra data are described below.

$^1$H NMR (400 MHz, $CDCl_3$): δ 7.09 (s, 4H), 6.77 (d, 4H, J=7.2 Hz), 5.35 (m, 1H), 5.25 (b, 0.8H), 4.42-3.60 (m, 8.2H), 2.34-2.27 (m, 4H), 1.50-1.60 (m, 10H), 1.15-1.30 (m, 56H), 0.86 (t, 6H, J=6.0 Hz); $^{13}$C NMR (100 MHz, $CDCl_3$): δ 173.2, 156.1, 143.5, 127.7, 113.9, 84.0, 70.6, 69.5, 68.7, 66.2, 62.4, 47.4, 41.7, 34.3, 34.1, 31.1, 29.3, 24.9, 22.7, 14.1.

Embodiment 3: Synthesis of 16-BGE-No-EDF and 16-BGE-EDFONP

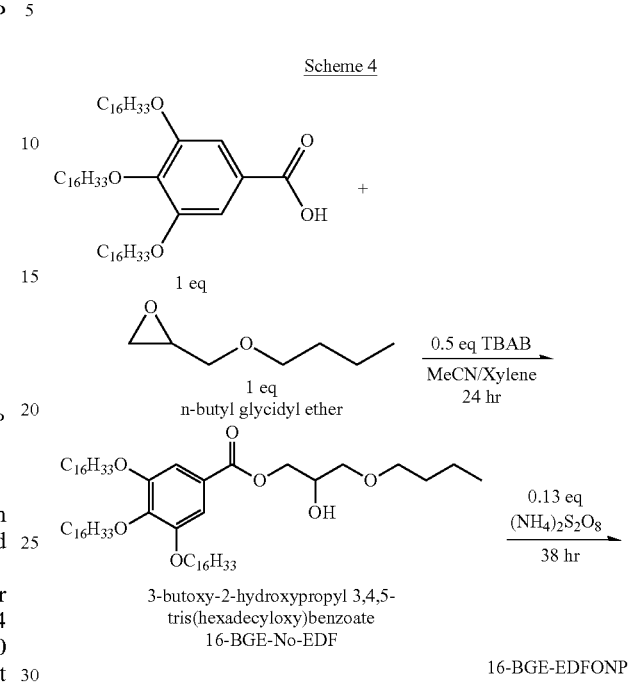

Scheme 4

The synthesis of 16-BGE-No-EDF and 16-BGE-EDFONP are shown in Scheme 4. The detailed synthesis of 16-BGE-No-EDF and 16-BGE-EDFONP is described below.

Figure 5A:
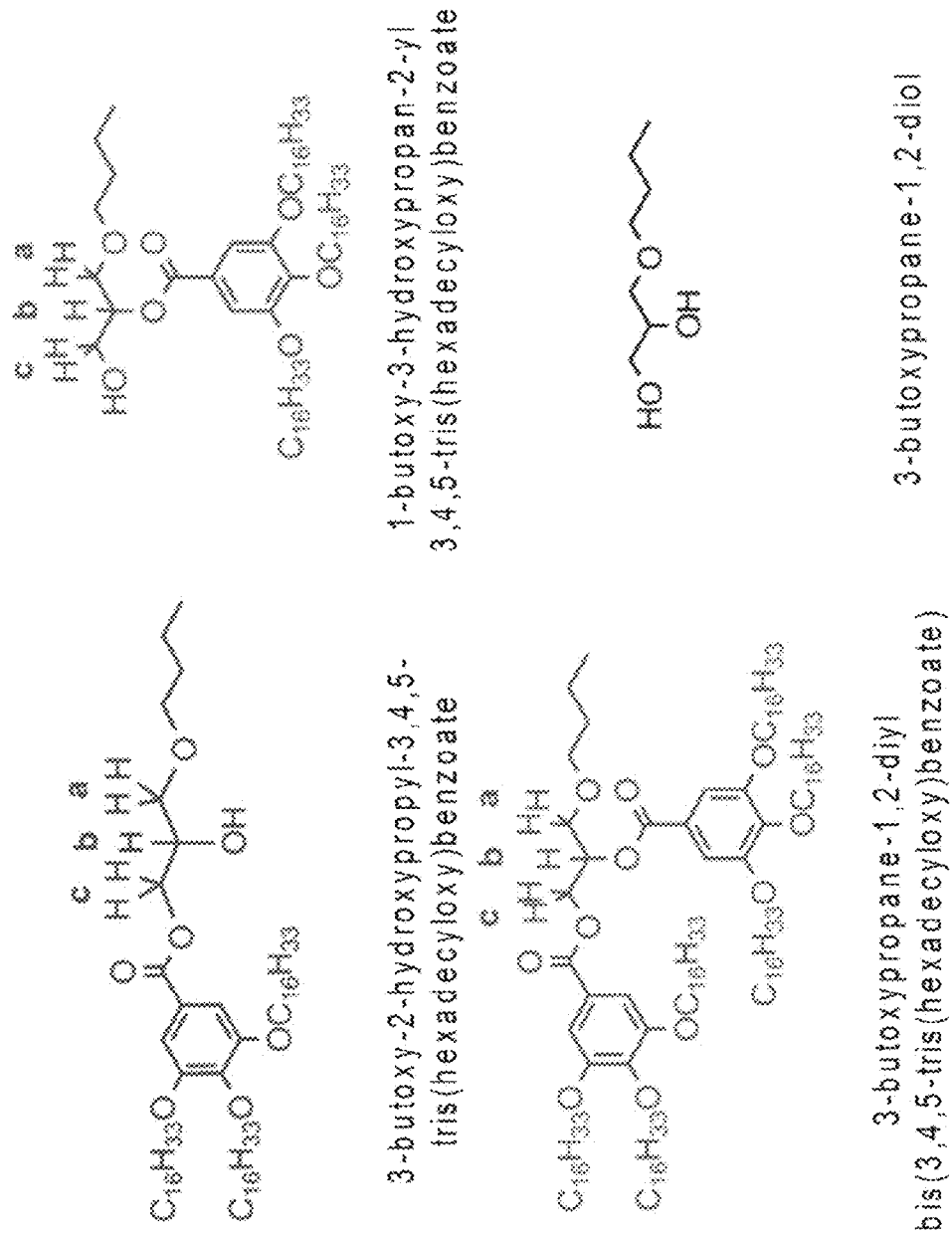
FIG. 5A shows the chemical structures of the components of the 16-BGE-EDFONP.
Figure 5B:
FIG. 5B is the $^1$H NMR spectra of 16-BGE-No-EDF (spectrum 5a) and 16-BGE-EDFONP (spectrum 5b).

16-BGE-No-EDF: A solution of butyl glycidyl ether (5.36 g, 41.20 mmol) and 3,4,5-tris(hexadecyloxy)benzoic acid (3.47 g, 4.12 mmol) in mix-solvent of acetonitrile (50 ml) and xylene (5 ml) was reflux for 24 h. The solvent was removed under reduced pressure and the crude product was purified by silica gel column chromatography using hexane and EtOAc as eluent to afford pure 3-butoxy-2-hydroxypropyl-3,4,5-tris(hexadecyloxy)benzoate (i.e. 16-BGE-No-EDF) in 55% combined yield (2.13 g). In this embodiment, since the steric hinderance is too large, only 3-monoacyl glycerol was obtained. The $^1$H NMR spectra of 16-BGE-No-EDF (spectrum 5a) is shown in FIG. 5B. Other spectrum data are described below.

$^1$H NMR (400 MHz, $CDCl_3$): δ7.24 (s, 2H), 4.35 (m, 2H), 4.09 (m, 1H), 3.98 (m, 6H), 3.50 (m, 4H), 1.81 (d, 1H, J=6.4 Hz), 1.75 (m, 6H), 1.55 (m, 2H), 1.45 (m, 6H), 0.88 (m, 12H); $^{13}$C NMR (100 MHz, $CDCl_3$): δ 170.6, 166.6, 152.8, 143.0, 142.7, 124.3, 123.8, 108.5, 108.3, 73.8, 73.5, 71.5, 71.4, 70.0, 69.1, 66.2, 62.9, 31.9, 31.6, 30.3, 29.5, 26.1, 22.6, 19.2, 14.0, 13.8; MS (MALDI-TOF): 995.96 [M+Na]$^+$.

16-BGE-EDFONP: The previous 16-BGE-No-EDF product (0.64 g, 0.65 mmol) and ammonium persulfate (0.02 g, 0.09 mmol) were heated and stirred under $N_2$ at 140° C. for 38 h. The crude product was then dissolved in $CH_2Cl_2$ and filtered. The filtrate was dried under vacuum to give a brown solid with a yield of 96% (0.61 g) which is composed of 3-butoxy-2-hydroxypropyl-3,4,5-tris(hexadecyloxy)benzoate (i.e. 3-monoacyl glycerol), 1-butoxy-3-hydroxypropan-2-yl 3,4,5-tris(hexadecyloxy)benzoate (i.e. 2-monoacyl glycerol), 3-butoxypropane-1,2-diyl bis(3,4,5-tris(hexadecyloxy)benzoate) (i.e. 2,3-diacyl glycerol) and 3-butoxypropane-1,2-diol (i.e. no acyl substituent). The chemical structures of the components of the 16-BGE-EDFONP are shown in FIG. 5A. The $^1$H NMR spectra of 16-BGE-EDFONP (spectrum 5b) are shown in FIG. 5B. Some spectra data of the 16-BGE-No-EDF are described below.

$^1$H NMR (400 MHz, CDCl$_3$); δ7.22 (m, 2H), 5.53 (b, 0.08H), 5.33 (m, 0.48H), 5.18 (b, 0.02H), 4.65 (m, 0.16H), 4.39 (m, 0.72H), 4.12 (m, 0.17H), 3.97 (m, 6.94H), 3.76 (m, 0.71H), 3.66 (m, 1.09H), 3.56 (m, 1.07H), 3.41 (m, 1.56H), 1.78 (m, 6H), 1.40 (m, 82H), 0.86 (t, 6H, J=7.2 Hz); $^{13}$C NMR (100 MHz, CDCl$_3$): δ 166.6, 152.8, 142.6, 124.3, 108.2, 76.6, 73.5, 71.6, 71.4, 70.1, 69.2, 69.0, 31.9, 31.6, 30.3, 29.5, 26.0, 22.6, 19.2, 14.1, 13.8.

Embodiment 4: Synthesis of EDF-Polymer

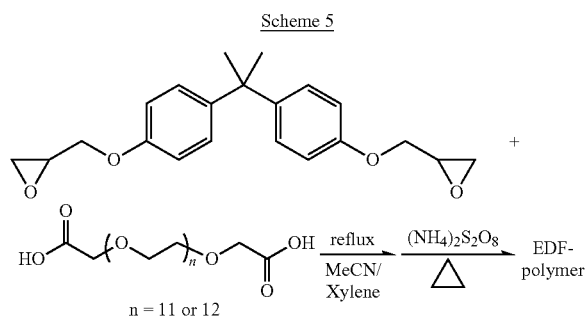

Scheme 5

In Scheme 5, bisphenol A diglycidyl ether was used to react with poly(ethylene glycol)bis(carboxymethyl) ether, and an alternating copolymer (abbreviated as EDF-polymer) was obtained. The detailed synthesis of EDF-polymer is described below.

A solution of bisphenol A diglycidyl ether (3.02 g, 8.87 mmol) and poly(ethylene glycol)bis(carboxymethyl) ether with a number-average molecular weight ($M_n$) about 600 (5.11 g, 8.85 mmol) in mix-solvent of acetonitrile (40 ml) and xylene (20 ml) was reflux at 85° C. for 24 h. The solvent was removed under reduced pressure. The crude product was recrystallized twice from acetonitrile, and a gel-type product is obtained (6.82 g, 82%).

Gel-type product (3.14 g) and ammonium persulfate (0.10 g, 0.43 mmol) were heated and stirred under N$_2$ at 150° C. for 38 h. The crude product was then dissolved in CH$_2$Cl$_2$ and filtered. The filtrate was dried under vacuum to give a brown product of a EDF-polymer with a yield of 92% (2.89 g).

Figure 6A:
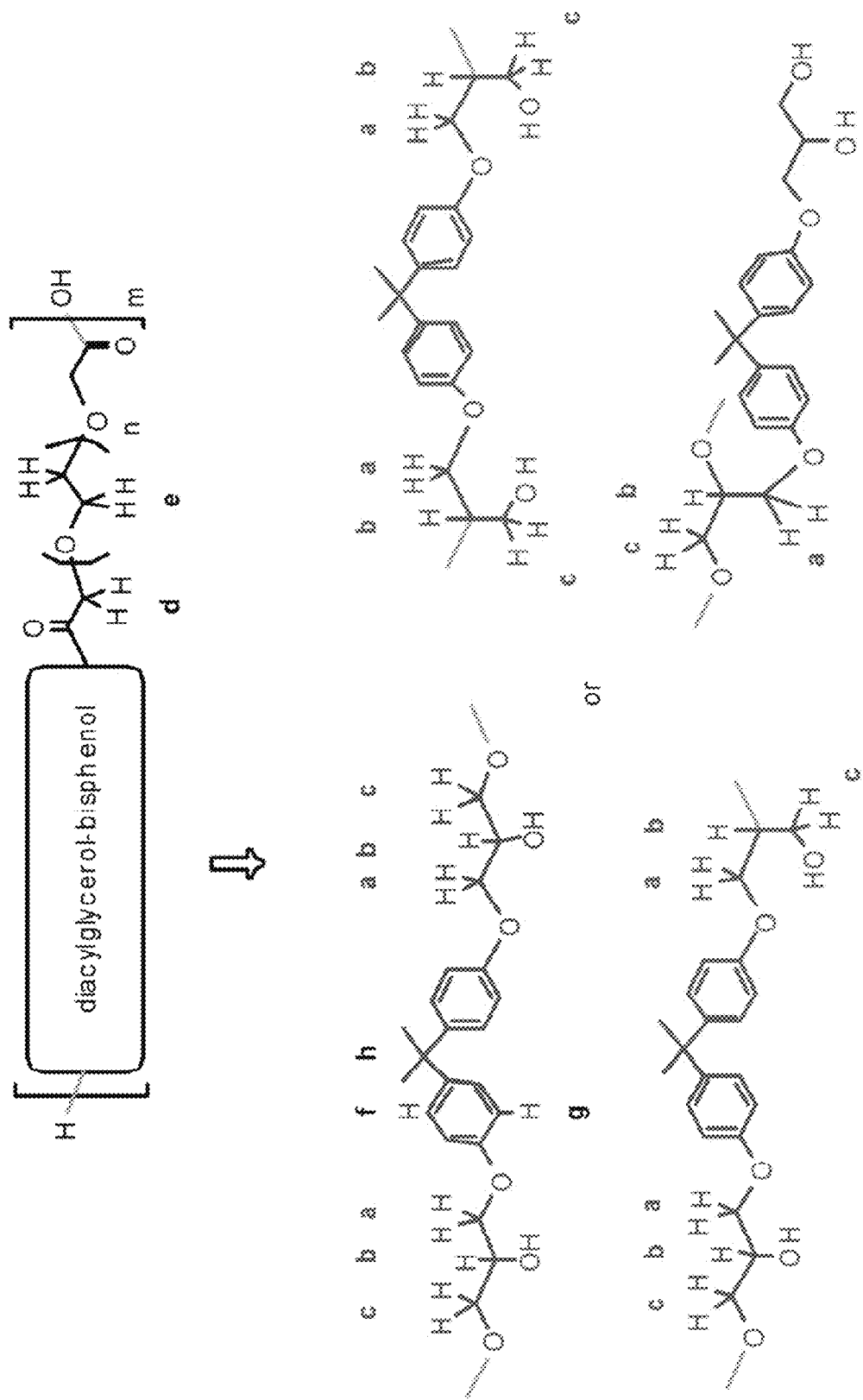
FIG. 6A shows the chemical structures of the EDF-polymer.
Figure 6B:
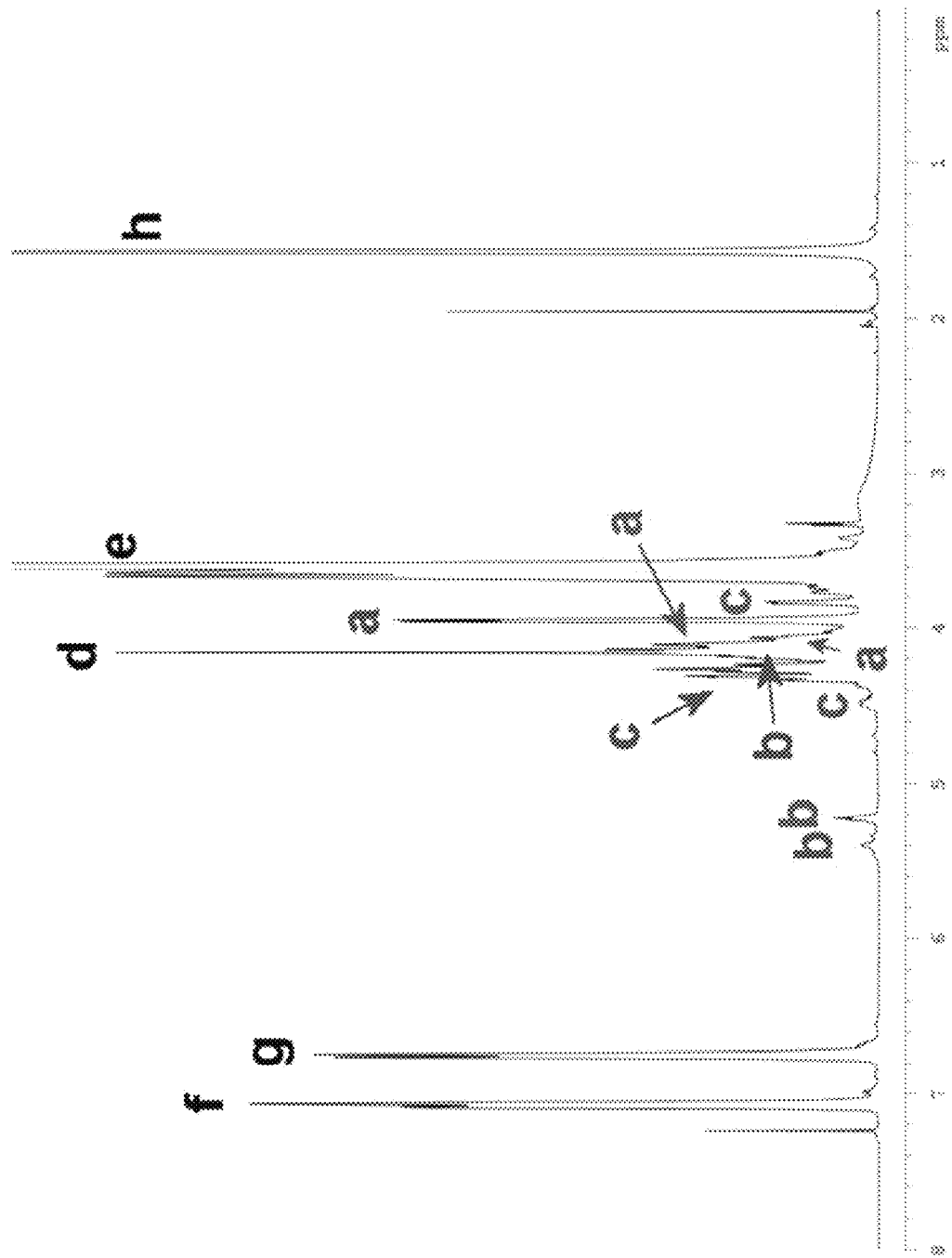
FIG. 6B is the $^1$H NMR spectrum of the EDF-polymer in CDCl$_3$ at room temperature.

The molecular weight of the EDF-Polymer was estimated by gel permeation chromatography and the number average molecular weight ($M_n$) of the EDF-Polymer was approximately 12,000 Da. The EDF-polymer contained 2-monoacylglycerol, 3-monoacylglycerol and diacylglycerol moieties, and no any non-acyl migrated side product was found. The chemical structures of the EDF-polymer is shown in FIG. 6A. The $^1$H NMR spectrum of the EDF-polymer in CDCl$_3$ at room temperature is shown in FIG. 6B. Some spectra data are described below.

$^1$H NMR (400 MHz, CDCl3): δ=7.09 (d, J=8.0 Hz), 6.77 (d, J=8.0 Hz), 5.41 (b), 5.27 (m), 4.71 (b), 4.51 (b), 4.36-4.04 (m), 3.97 (b), 3.84 (b), 3.78 (b), 3.61 (b), 3.44 (b), 3.31 (b), 2.81 (m), 2.72 (b), 1.78-1.74 (m, 12H), 1.60 (b); $^{13}$C NMR (100 MHz, CDCl$_3$): δ 171.5, 156.3, 143.5, 113.9, 77.3, 73.5, 72.5, 71.8, 71.7, 70.9, 69.1, 68.0, 65.9, 63.7, 63.0, 61.6, 58.8, 41.7, 31.0.

Characterization and Properties of EDFONPs

Investigations based on the combination of NMR, high-resolution transmission electron microscopy (HRTEM), dynamic light scattering (DLS) and photoluminescence (PL) spectra reveal that the densely aggregated structures of the acyl-migrated product are discrete self-assembled excitation-dependent fluorescent organic nanoparticles (EDFONPs).

Particle Size Measurements

The HRTEM image of 18-EDFONP with a diameter of approximately 7.6 nm is shown in FIG. 7A. The HRTEM images were taken with a JEM-2100F (JEOL, Japan) operated at 200 kV, and the sample was prepared by drop-casting a suspension of CH$_2$Cl$_2$ onto a quantifoil holey carbon grid.

Figure 7B:
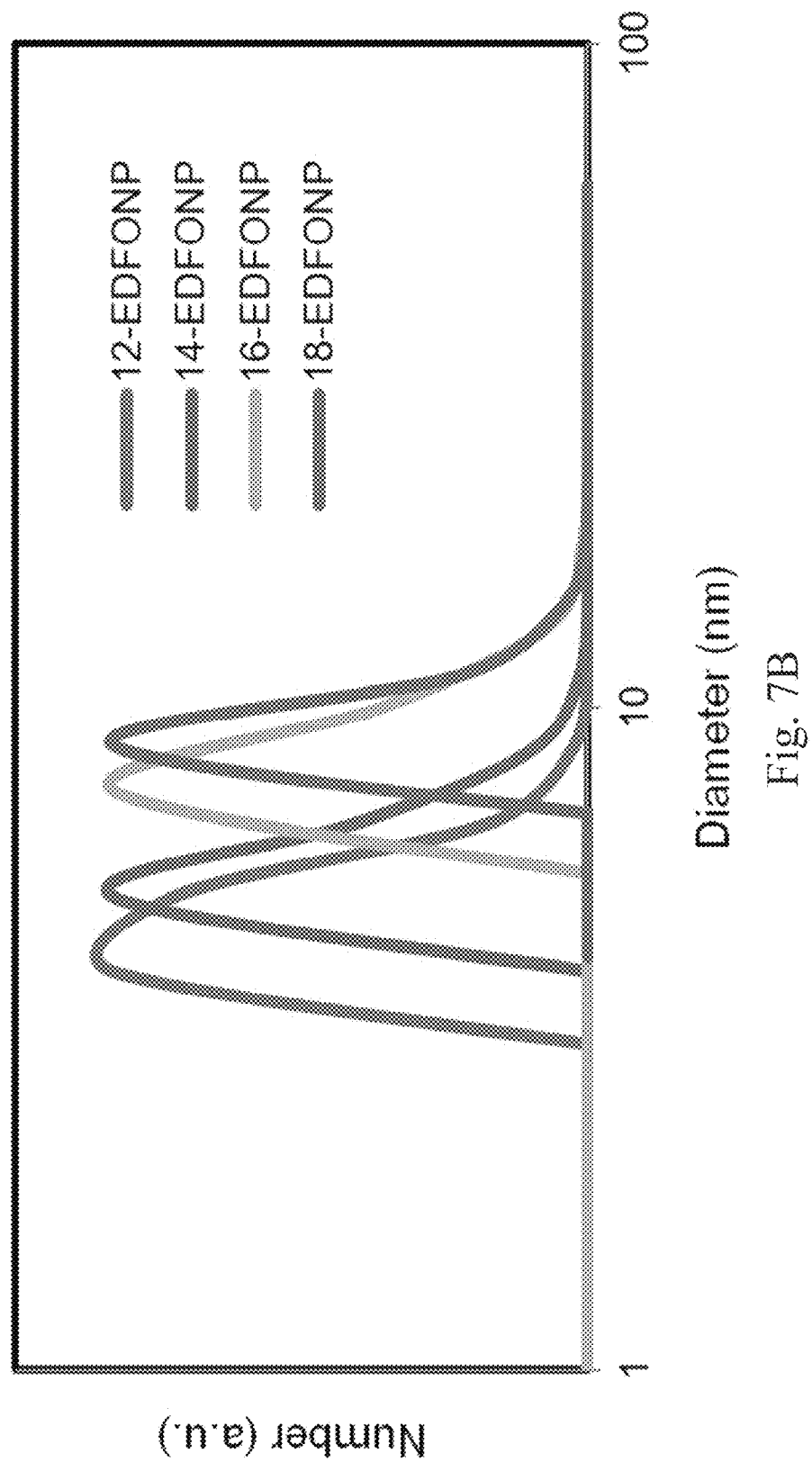
FIG. 7B is a diagram showing mean diameters, measured by dynamic light scattering, of 12-EDFONP to 18-EDFONP in CH$_2$Cl$_2$.

The mean diameters, measured by dynamic light scattering, of 12-EDFONP to 18-EDFONP in CH$_2$Cl$_2$ are shown in FIG. 7B. The hydrodynamic particle size is measured with dynamic light scattering (Brookhaven 90 Plus, USA). The obtained mean diameters of 12-EDFONP to 18-EDFONP are 4.8, 6.0, 8.6 and 9.5 nm, respectively.

Figure 7C:
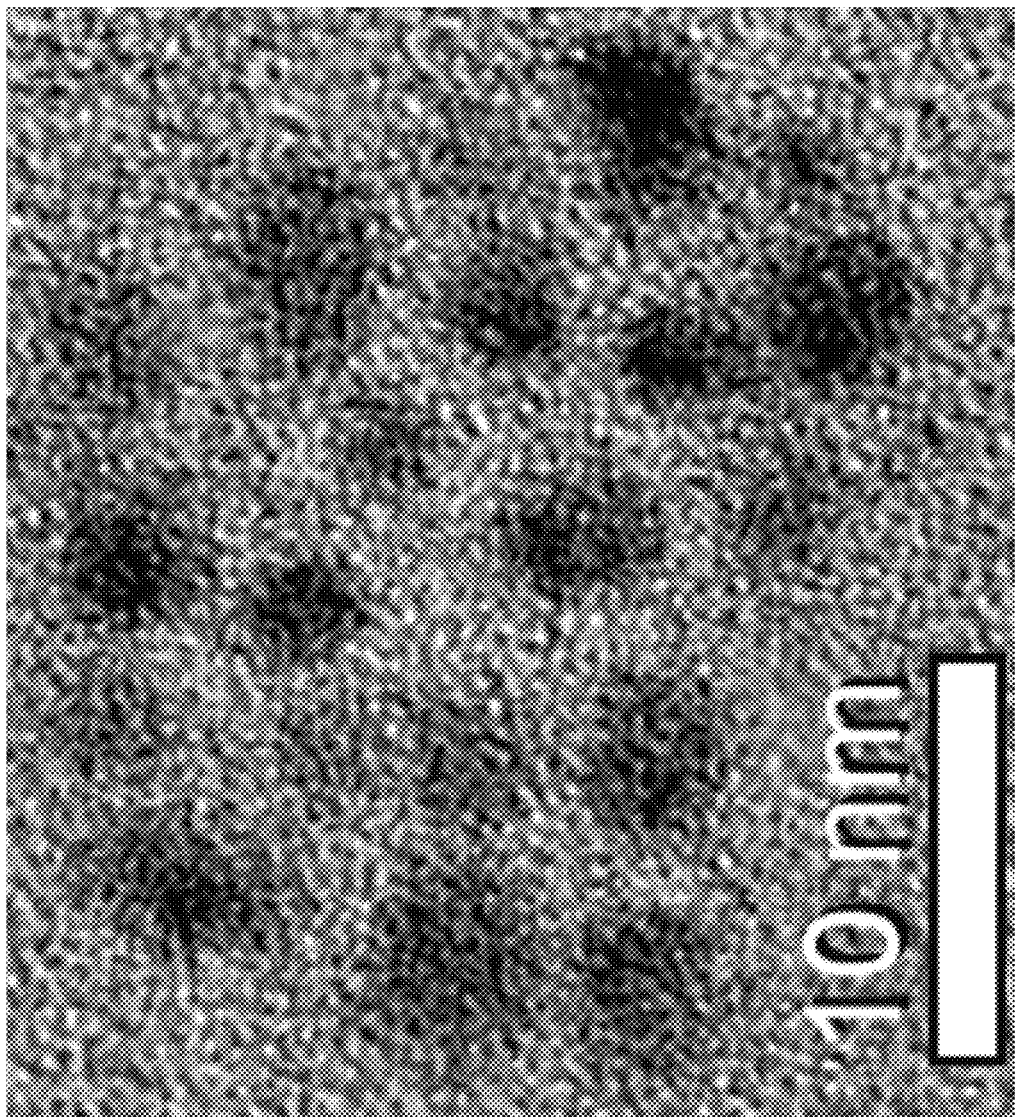
FIG. 7C is a HRTEM image of the EDF-polymer.

FIG. 7C is a HRTEM image of the EDF-polymer above shows aggregated nanoparticles with a scale bar of 10 nm. It shows that the diameter of the nanoparticles of the EDF-polymer is about 5 nm.

Excitation and Emission Spectrum

Figure 8A:
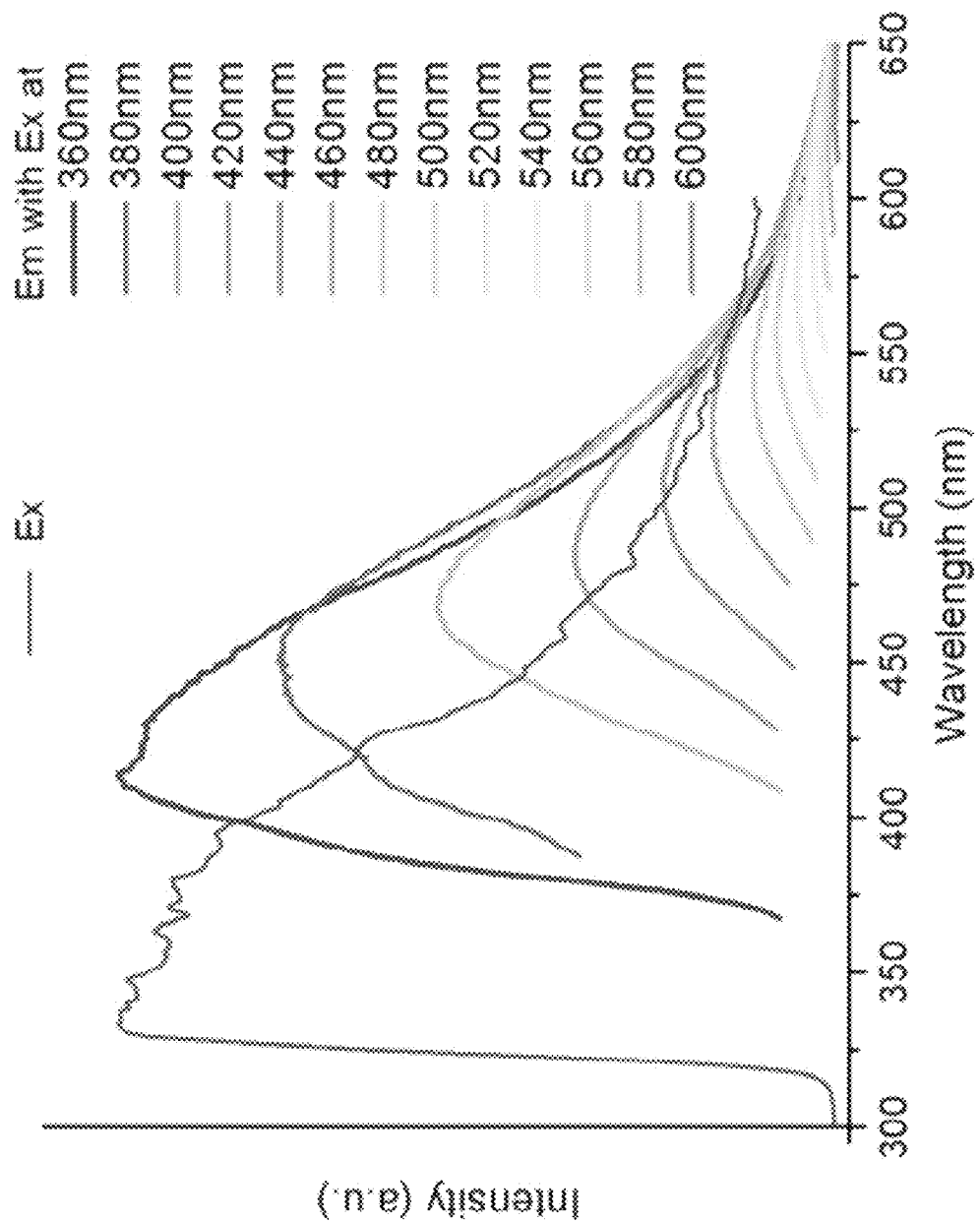
FIG. 8A is excitation and emission spectra of 12-EDFONP at a concentration of 10 mM with a excitation-dependent visible fluorescence from 410-620 nm.

All of the EDFONPs above have similar photoluminescence excitation and emission behaviors in CH$_2$Cl$_2$ and CHCl$_3$ solvents. FIG. 8A is excitation and emission spectra of 12-EDFONP at a concentration of 10 mM. In FIG. 8A, the excitation spectrum of 12-EDFONP exhibits a broad peak at 330 nm with a shoulder that extends to approximately 650 nm. The excitation of 12-EDFONP from 360 to 600 nm results in an excitation-dependent fluorescence from 415 to 660 nm, where the intensity remarkably decreases. FIG. 8B is a fluorescent photograph of 12-EDFONP in a CH$_2$Cl$_2$ solution, which was simultaneously excited at 404 and 510 nm and exhibits intense blue and yellow fluorescence in the same quartz cuvette.

Figure 9A:
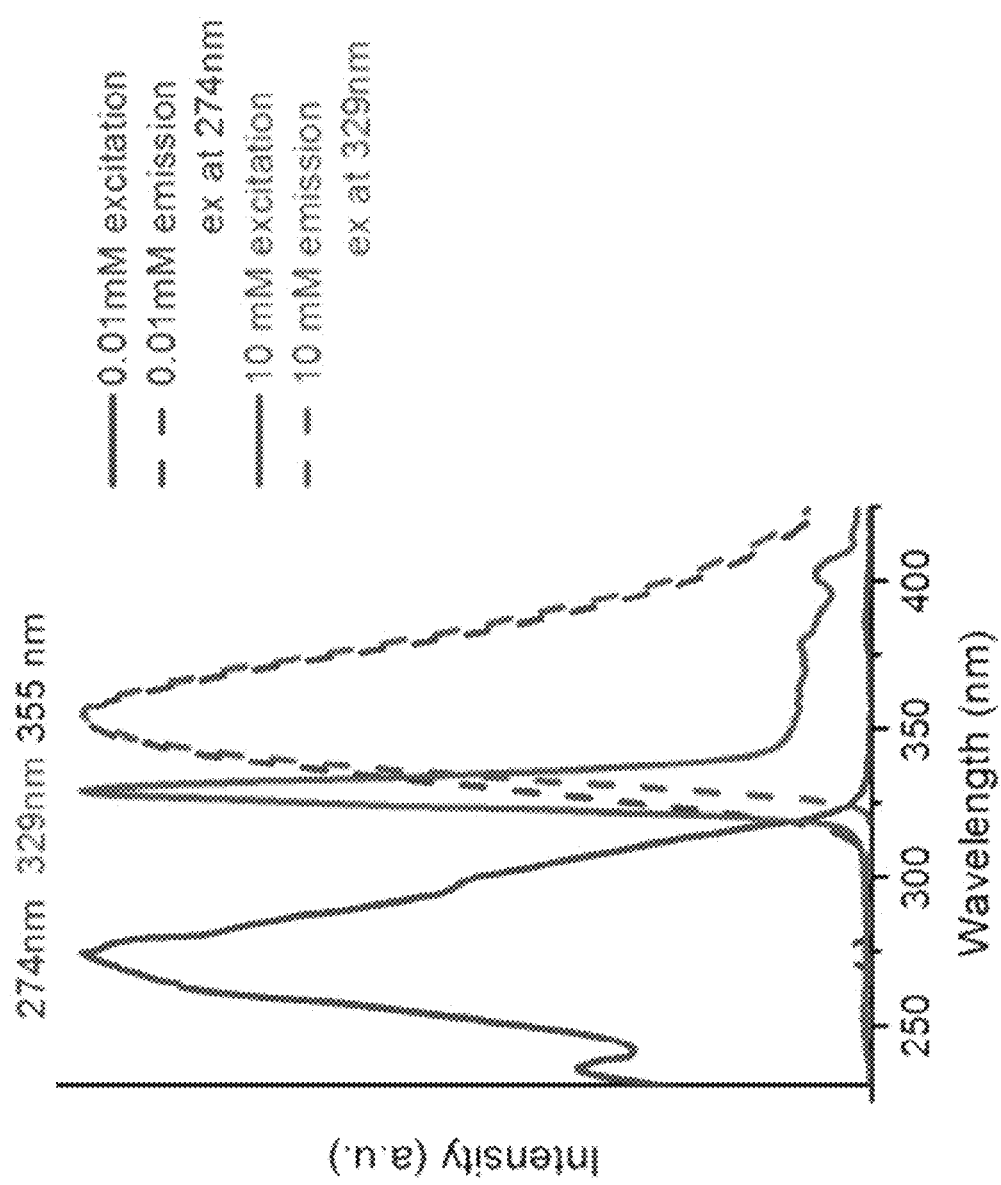
FIG. 9A is excitation and emission spectra of 12-No-EDF at concentrations of 0.01 and 10 mM.

FIG. 9A is excitation and emission spectra of 12-No-EDF at concentrations of 0.01 and 10 mM. It can be clearly seen that no excitation dependent fluorescence occurred. In FIG. 9A, the excitation spectrum of 12-No-EDF at a concentration of 0.01 mM and 10 mM displays only one excitation peak at 274 nm and 329 nm, respectively. The emission spectra of 12-No-EDF at a concentration of 0.01 mM and 10 mM were the same, and had a relatively shaper UV fluorescence peak at 353 nm when both were excited at 274 nm and 329 nm, respectively.

Figure 9B:
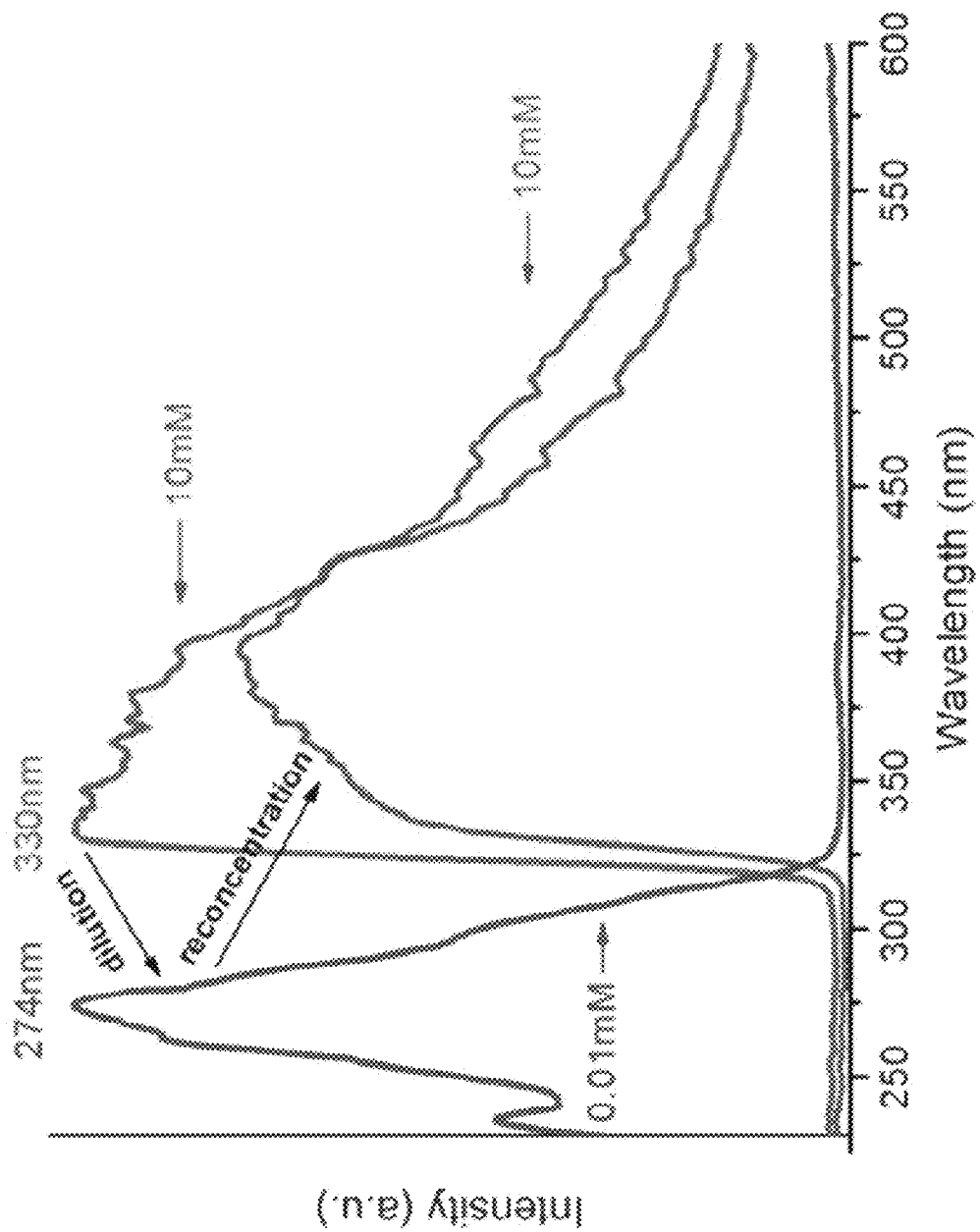
FIGS. 9B and 9C are excitation and emission spectra of 12-EDFONP at an initial concentration of 10 mM (red line), then diluted to 0.01 mM (blue line) and reconcentrated back to 10 mM (green line), respectively.
Figure 9C:
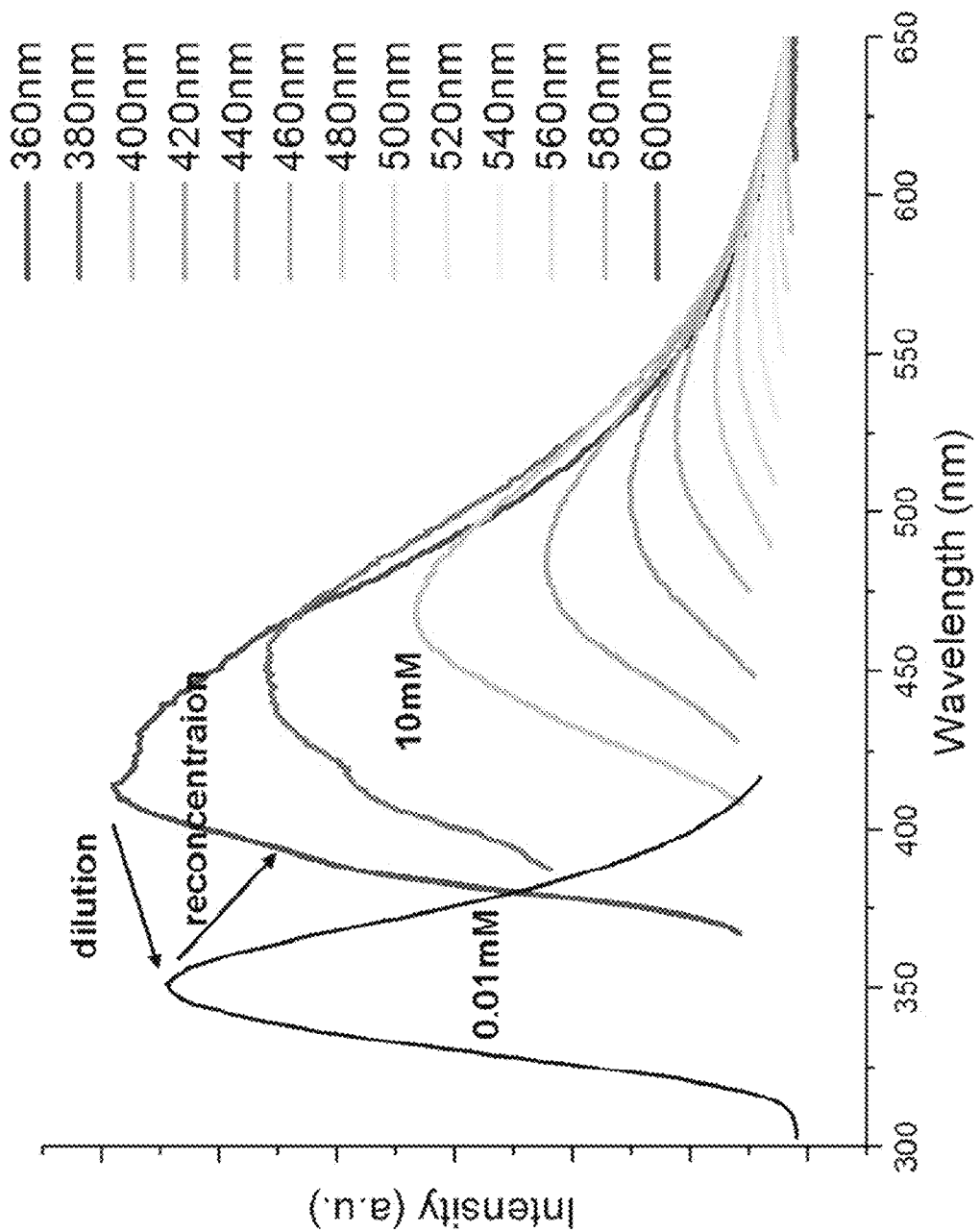

FIGS. 9B and 9C are excitation and emission spectra of 12-EDFONP at an initial concentration of 10 mM (red line), then diluted to 0.01 mM (blue line) and reconcentrated back to 10 mM (green line), respectively. Comparing FIGS. 9A to 9C, when the concentrations of 12-EDFONP and 12-No-EDF are subsequently decreased from 10 to 0.01 mM by dilution, both exhibit similar excitation and emission spectra. Two excitation peaks at 235 and 274 nm and one emission peak at 355 nm (excited at 274 nm) were observed, which indicated that both 12-EDFONP and 12-No-EDF dissociated into individual 3,3'-12-BTBA and 2,2'-12-BTBA molecules without dense aggregation when diluted to a concentration of 0.01 mM.

However, when 12-EDFONP is reconcentrated from 0.01 mM to 10 mM, the broad characteristic excitation (spectrum in green in FIG. 9B) and excitation-dependent fluorescence reappears (spectrum in FIG. 9C). This result clearly indicates that the EDF behavior is induced by the dense aggregation in the self-assembled organic nanoparticles but not by the individual 12-BTBA molecule itself.

To determine the functional groups—including bisphenol, benzoate and monoacylglycerol—that are responsible for the EDF behavior, two compounds were prepared by changing the benzoate and bisphenol A groups to the heptadecyl carboxylate and n-butyl glycidyl ether groups, respectively. The obtained EDFONPs are 17-EDFONP and 16-BGE-EDFONP above.

Figure 10:
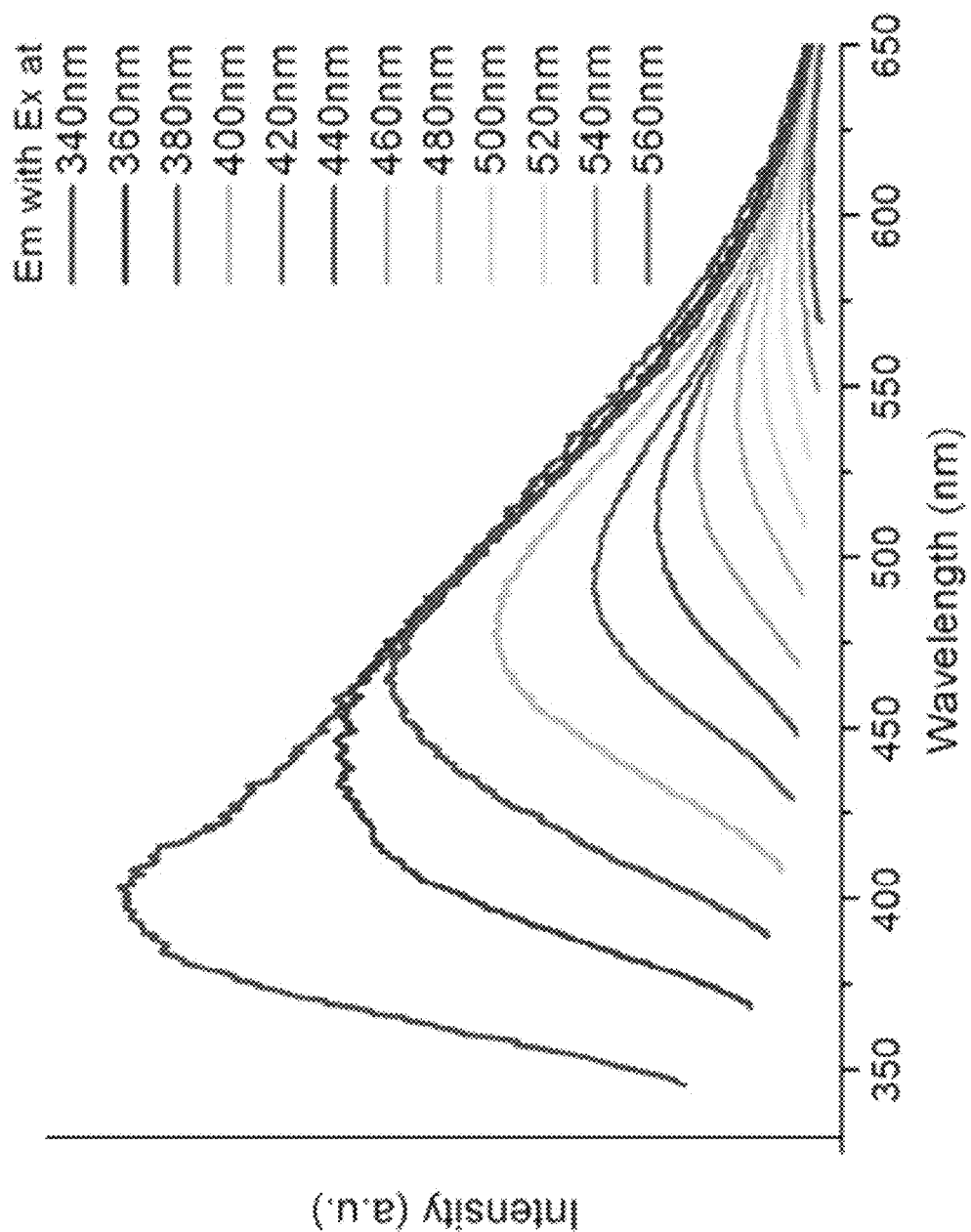
FIG. 10 is emission spectrum of 17-EDFONP based on stearic acid at a concentration of 10 mM with a visible EDF phenomena.
Figure 11:
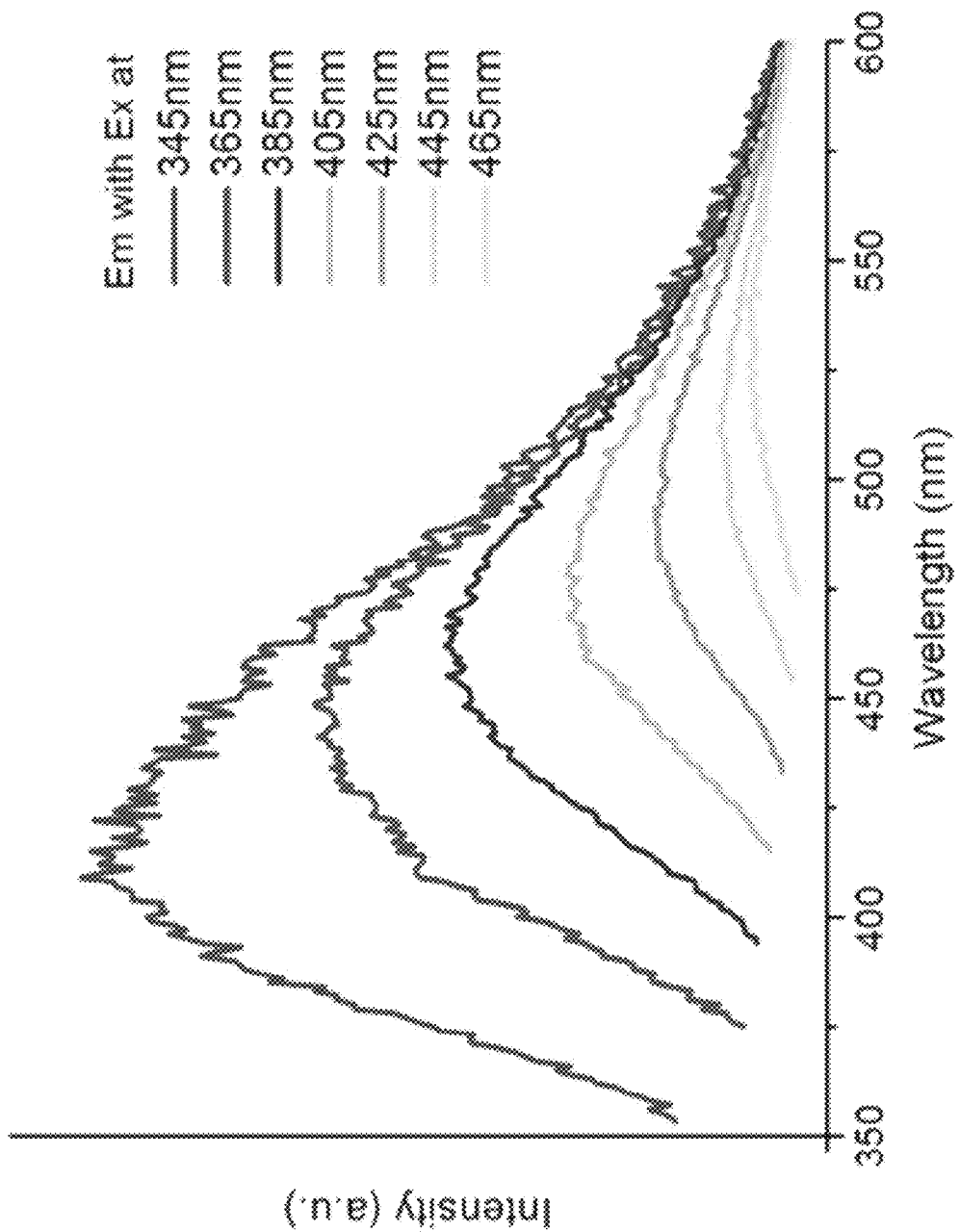
FIG. 11 is emission spectrum of 16-BGE-EDFONP at a concentration of 10 mM with a visible EDF phenomena.

FIG. 10 is emission spectrum of 17-EDFONP based on stearic acid at a concentration of 10 mM with a visible EDF phenomena. FIG. 11 is emission spectrum of 16-BGE-EDFONP at a concentration of 10 mM with a visible EDF phenomena. From FIGS. 10 and 11, it can be known that both of the modified compounds also exhibited the EDF behavior, which clearly indicates that the 2-monoacylglycerol group is responsible for the EDF behavior. In addition, this result also indicates that the EDF behavior is a common phenomenon for the 2-monoacylglycerol-dominated mixture. Note that the bis(monoacyl glycerol) clusters serve as chromophores here without any extended conjugated system.

Figure 12:
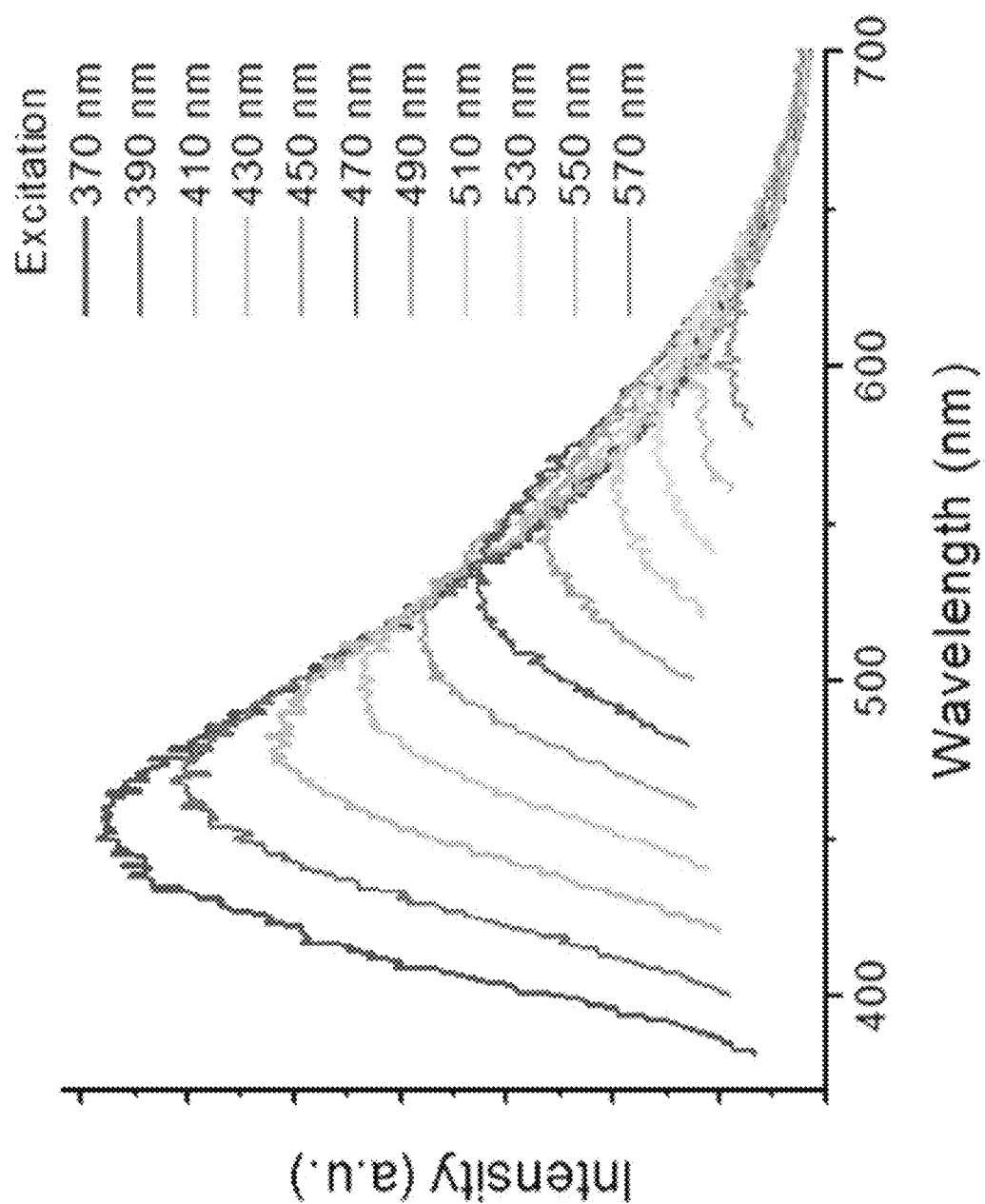
FIG. 12 is emission spectrum of the EDF-Polymer.

FIG. 12 is emission spectrum of the EDF-Polymer. In FIG. 12, the emission spectrum of EDF-Polymer in $CHCl_3$ also exhibited an excitation-dependent fluorescence behavior which is similar to that of the n-EDFONPs.

Quantum Yield and Fluorescence Lifetime

The quantum yield of 12-EDFONP and the EDF-polymer was respectively determined to be 8.3% and 6.1% with coumarin 1 (i.e. 7-diethylamino-4-methylcoumarin) in ethanol (quantum yields=73%) as a reference. Quantum Yields are calculated using the equation (1) below, where I is integrated fluorescence intensity, E is extinction coefficient, n is refractive index, and the subscript index R indicates the standard.

$$Q=(Q_R \cdot I \cdot E_R \cdot n^2)/(I_R \cdot E \cdot n_R^2) \quad (1)$$

The fluorescence lifetime measurement of the excitations of 12-No-EDF at 329 nm and 12-EDFONP at 360 nm are determined to be 0.98 and 1.54 ns, respectively.

Structural Characterization of the Self-Assembled EDFONPs

Figure 13:
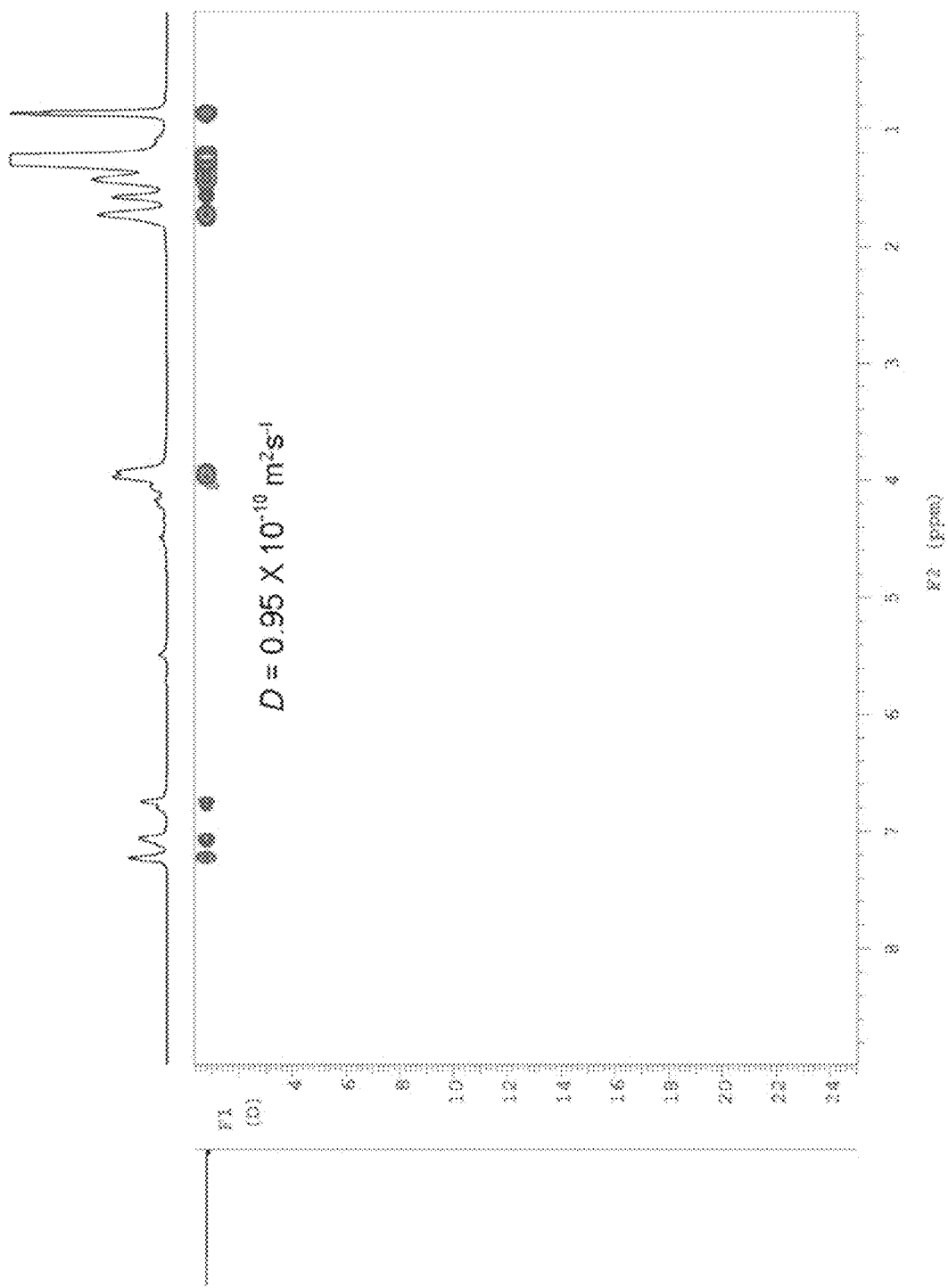
FIG. 13 is DOSY $^1$H NMR 2D spectrum of 18-EDFONP in a solution.

Further structural characterization using NMR experiments indicate the formation of decamers for n-BTBA. The decamer contains five 2,2'-n-BTBA and five 2,3-n-BTBA Diffusion Coefficient Measurement The diffusion coefficient is measured using the NMR DOSY technique for solutions of 18-EDFONP, and the result is shown FIG. 13. In FIG. 13, the spectrum shows only one diffusion species that is characterized by the diffusion coefficient (D) of $0.95 \times 10^{-10}$ m$^2$s$^{-1}$.

The hydrodynamic radius ($r_H$) of 3.9 nm is calculated from the Stokes-Einstein equation (2) below, where k is the Boltzmann constant, T is the temperature, and η is the viscosity of solution.

$$r_H = kbT/6\pi\eta D \quad (2)$$

The molecular weight of 18-EDFONP is estimated to be approximately 24,000 from the Mark-Houwink-Sakaruda (MHS) equation (3) below, which is determined by the phenolphthalein poly(ether sulfone) in chloroform solution.

$$D=(2.45\pm0.04)\times10^{-4}\,MW^{-(0.55\pm0.05)} \quad (3)$$

Therefore, it was suggested that the nanoparticles of 18-EDFONP contain clusters having about ten 18-BTBA.

Components and Geometry of the Decamer

Figure 14:
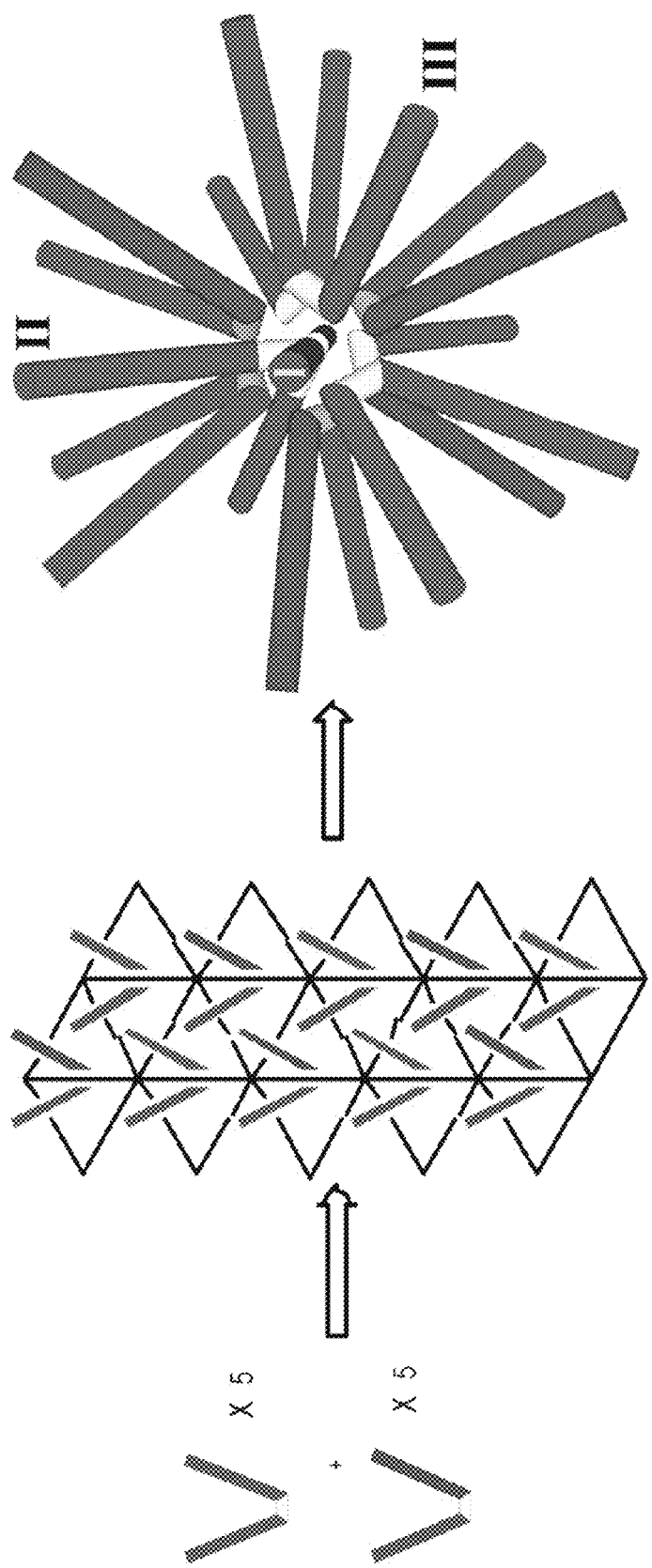
FIG. 14 is a diagram showing the formation of Great Stellated Dodecahedral decamers by the self-assembly of five 2,2'-n-BTBA and five 2,3-n-BTBA.

The components of the decamaer was determined by $^1$H NMR. From the $^1$H NMR of 12-EDFONP (see FIG. 2A), the ratio of 2,2'-12-BTBA and 2,3-12-BTBA determined using $^1$H NMR is approximately 1:1. Therefore, the decamer should be composed of five 2,2'-n-BTBA and five 2,3-n-BTBA, i.e. there were fifteen 2-monoacylglycerol and five 2-monoacylglycerol. These 20 monoacylglycerol moieties could construct a Great Stellated Dodecahedral, in which every three neighboring monoacylglycerol groups form a triangular unit. The formation of Great Stellated Dodecahedral decamers by the self-assembly of five 2,2'-n-BTBA and five 2,3-n-BTBA is shown in FIG. 14. In FIG. 14, the 2-positional isomers are represented by red rods, and the 3-positional isomers are represented by blue rods.

Geometry of EDF-polymer

Figure 15:
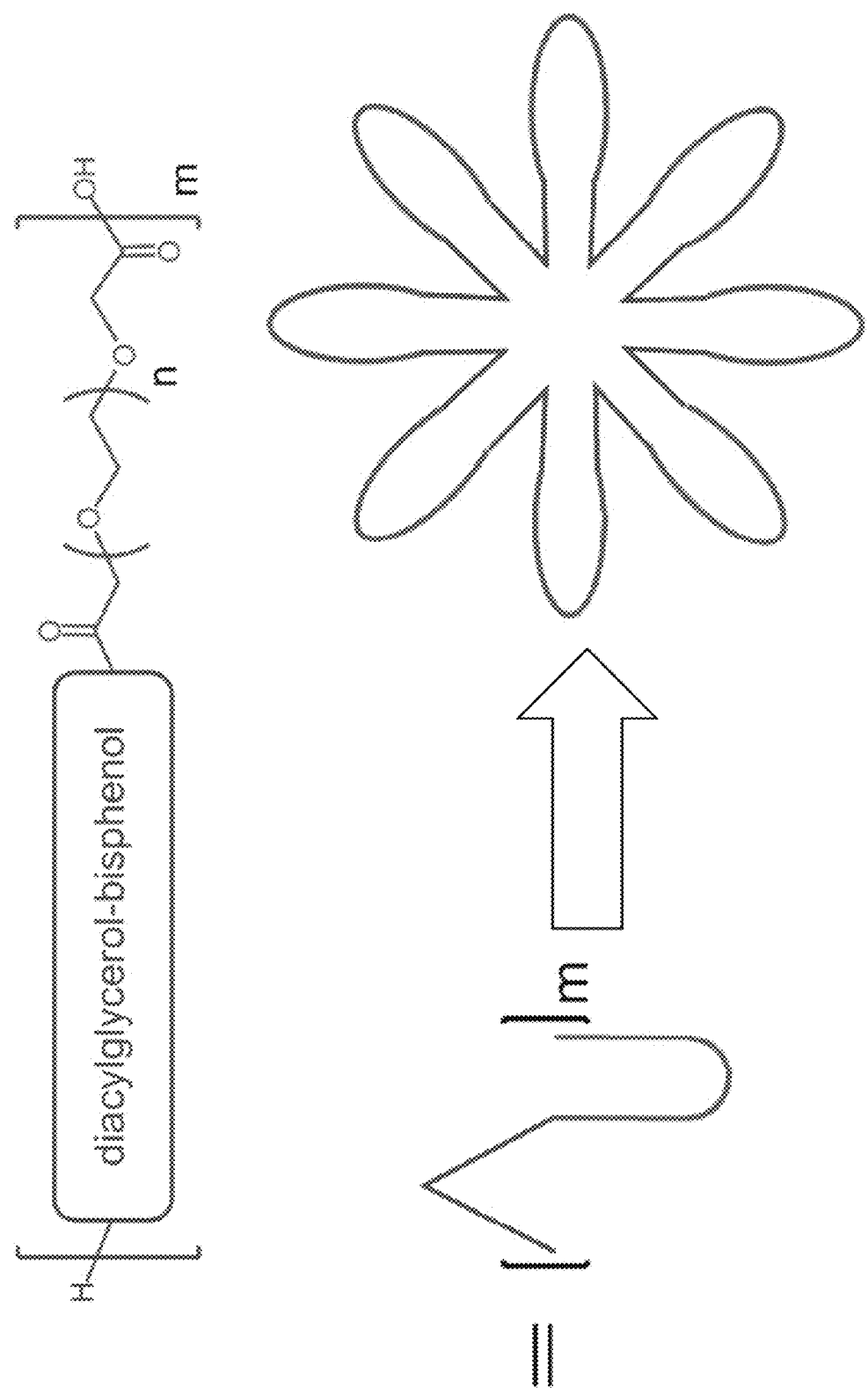
FIG. 15 is a cartoon model of nanoparticle with bisphenol A aggregates and poly(ethylene glycol) moieties serving as core and shell compartments respectively.

FIG. 15 is a cartoon model of nanoparticle of EDF-polymer. In FIG. 15A, a nanoparticle of EDF-Polymer are constructed through a self-assemble process with that the bisphenol A aggregates to serve as a core (blue parts), and the poly(ethylene glycol) moieties serves as a shell (red parts).

According to the results mentioned above, the EDFONPs can be formed through a ring opening reaction and a radical-catalyzed 3,2-acyl migration between an epoxy glycidyl ether and a carboxylic acid.

All the features disclosed in this specification (including any accompanying claims, abstract, and drawings) may be replaced by alternative features serving the same, equivalent or similar purpose, unless expressly stated otherwise. Thus, each feature disclosed is one example only of a generic series of equivalent or similar features.

What is claimed is:

1. Excitation-dependent fluorescent organic nanoparticles, each comprising:
   a cluster of aggregated molecules of 2-monoacylglycerol and 3-monoacylglycerol, wherein 2-monoacylglycerol comprises

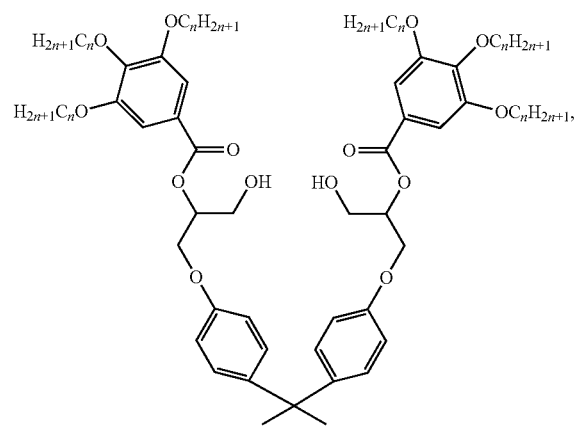

3-monoacylglycerol comprises
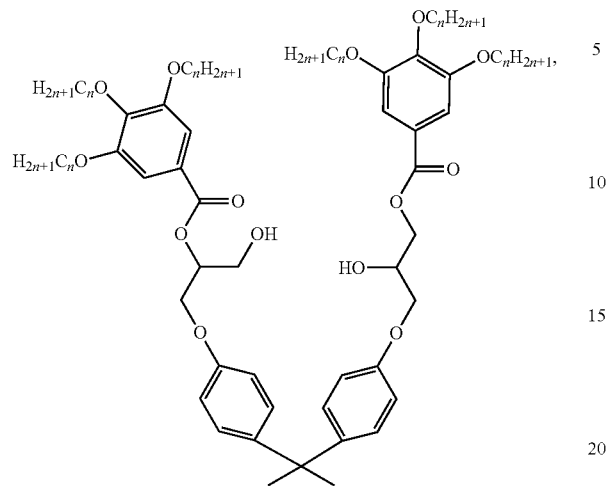
and n=12-18.